United States Patent
Seki et al.

(10) Patent No.: US 7,552,478 B2
(45) Date of Patent: Jun. 23, 2009

(54) NETWORK UNAUTHORIZED ACCESS PREVENTING SYSTEM AND NETWORK UNAUTHORIZED ACCESS PREVENTING APPARATUS

(75) Inventors: Yoshinaga Seki, Tokyo (JP); Shinji Hasei, Osaka (JP); Miho Uotani, Osaka (JP); Tatsuya Makino, Tokyo (JP)

(73) Assignee: NEC Corporation, Tokyo (JP)

( * ) Notice: Subject to any disclaimer, the term of this patent is extended or adjusted under 35 U.S.C. 154(b) by 848 days.

(21) Appl. No.: 10/927,128

(22) Filed: Aug. 27, 2004

(65) Prior Publication Data

US 2005/0050365 A1 Mar. 3, 2005

(30) Foreign Application Priority Data

Aug. 28, 2003 (JP) ............................. 2003-305246

(51) Int. Cl.
*G06F 11/00* (2006.01)
(52) U.S. Cl. ............................. 726/23; 726/4
(58) Field of Classification Search ............... 726/4, 726/13, 23
See application file for complete search history.

(56) References Cited

U.S. PATENT DOCUMENTS

| | | | | |
|---|---|---|---|---|
| 5,757,924 A | * | 5/1998 | Friedman et al. | 713/151 |
| 5,905,859 A | * | 5/1999 | Holloway et al. | 726/22 |
| 5,978,854 A | * | 11/1999 | Fujimori et al. | 709/245 |
| 6,009,102 A | * | 12/1999 | Horikawa et al. | 370/401 |
| 6,061,739 A | * | 5/2000 | Reed et al. | 709/245 |
| 6,115,376 A | * | 9/2000 | Sherer et al. | 370/389 |
| 6,128,294 A | * | 10/2000 | Oura et al. | 370/389 |
| 6,151,331 A | * | 11/2000 | Wilson | 370/465 |
| 6,151,679 A | * | 11/2000 | Friedman et al. | 726/3 |
| 6,199,112 B1 | * | 3/2001 | Wilson | 709/227 |
| 6,263,444 B1 | * | 7/2001 | Fujita | 726/25 |
| 6,295,276 B1 | * | 9/2001 | Datta et al. | 370/218 |
| 6,438,607 B1 | * | 8/2002 | Fujimori et al. | 709/245 |
| 6,608,817 B1 | * | 8/2003 | Ivory | 370/250 |

(Continued)

FOREIGN PATENT DOCUMENTS

JP 2002-073433 3/2002

(Continued)

OTHER PUBLICATIONS

Whalen, Sean, "An Introduction to ARP Spoofing," Apr. 2001, pp. 1-7 (paper).

(Continued)

*Primary Examiner*—David G Cervetti
(74) *Attorney, Agent, or Firm*—Foley & Lardner LLP

(57) ABSTRACT

There is disclosed a network unauthorized access preventing system in which in a network to which one or more information processing apparatuses and a network unauthorized access preventing apparatus are connected, an unauthorized apparatus which is not authorized to access the network is prevented from accessing the network. The system includes an information processing apparatus which sends a correct ARP response packet to the unauthorized apparatus in response to an ARP request broadcast from the unauthorized apparatus, and a network unauthorized access preventing apparatus which sends an ARP response packet containing a false MAC address as the MAC address of the information processing apparatus to the unauthorized apparatus immediately after the correct ARP response packet is sent to the unauthorized apparatus.

22 Claims, 11 Drawing Sheets

U.S. PATENT DOCUMENTS

| | | | |
|---|---|---|---|
| 6,640,251 B1* | 10/2003 | Wiget et al. | 709/238 |
| 6,745,333 B1* | 6/2004 | Thomsen | 726/23 |
| 6,771,649 B1* | 8/2004 | Tripunitara et al. | 370/395.54 |
| 7,039,021 B1* | 5/2006 | Kokudo | 370/310 |
| 7,058,059 B1* | 6/2006 | Henry et al. | 370/395.1 |
| 7,058,976 B1* | 6/2006 | Dark | 726/23 |
| 7,072,337 B1* | 7/2006 | Arutyunov et al. | 370/389 |
| 7,124,197 B2* | 10/2006 | Ocepek et al. | 709/232 |
| 7,234,163 B1* | 6/2007 | Rayes et al. | 726/22 |
| 7,260,648 B2* | 8/2007 | Tingley et al. | 709/245 |
| 7,320,070 B2* | 1/2008 | Baum | 713/153 |
| 7,339,914 B2* | 3/2008 | Bhagwat et al. | 370/338 |
| 7,346,057 B2* | 3/2008 | Foschiano et al. | 370/392 |
| 7,360,245 B1* | 4/2008 | Ramachandran et al. | 726/13 |
| 2002/0010869 A1* | 1/2002 | Kim | 713/201 |
| 2002/0112076 A1* | 8/2002 | Rueda et al. | 709/245 |
| 2002/0133586 A1* | 9/2002 | Shanklin et al. | 709/224 |
| 2003/0039260 A1* | 2/2003 | Fujisawa | 370/401 |
| 2003/0131133 A1* | 7/2003 | Nyu et al. | 709/245 |
| 2004/0003285 A1* | 1/2004 | Whelan et al. | 713/201 |
| 2004/0022253 A1* | 2/2004 | Foschiano et al. | 370/395.54 |
| 2004/0030804 A1* | 2/2004 | Wiget et al. | 709/245 |
| 2004/0049586 A1* | 3/2004 | Ocepek et al. | 709/229 |
| 2004/0054926 A1* | 3/2004 | Ocepek et al. | 713/201 |
| 2004/0071164 A1* | 4/2004 | Baum | 370/469 |
| 2004/0078471 A1* | 4/2004 | Yang | 709/227 |
| 2006/0047791 A1* | 3/2006 | Bahl | 709/220 |
| 2006/0224774 A1* | 10/2006 | Tanji | 709/245 |
| 2007/0223494 A1* | 9/2007 | Hyyrynen et al. | 370/395.54 |

FOREIGN PATENT DOCUMENTS

| | | |
|---|---|---|
| JP | 2003-099339 A | 4/2003 |
| JP | 2002-354080 A | 7/2004 |

OTHER PUBLICATIONS

Whalen, Sean, "An Introduction to ARP Spoofing," Apr. 2001, pp. 8-44 (slides).

Daigo et al., "A MAC Address-based Illegal User Detection System," The Development of a Network User Illegal Communications Detection System Using the MAC Address, FY 2002 IPA Results Report Collection, 8 pages.

"Understanding experimental TCP/IP network programming from the ground up," Ohmsha, 2001, pp. 255-256.

Y. Murayama, "Experimental program using ARP; TCP/IP network experimental programming from the ground up," 1st Edition, 1st printing, Aug. 24, 2001, 19 pages.

* cited by examiner

NETWORK UNAUTHORIZED ACCESS PREVENTING SYSTEM AND NETWORK UNAUTHORIZED ACCESS PREVENTING APPARATUS

BACKGROUND OF THE INVENTION

1. Field of the Invention

The present invention relates to a network unauthorized access preventing system and network unauthorized access preventing apparatus for preventing unauthorized access to a network by an apparatus, which is detected as not being authorized to access the network, by sending a packet having a spoof ARP (Address Resolution Protocol) to the apparatus.

2. Description of the Related Art

Recently, information processing of various types has been greatly streamlined by networks such as the Internet, intranet, etc., in various environments such as companies, public offices, schools, households, etc. These networks are therefore indispensable as contemporary infrastructures.

In the meantime, computer viruses are spread over the networks causing destruction of important information, and the networks are invalidly accessed increasing chances of information leakage. Achieving improvement of network security is thus an important social issue.

Under this circumstance, many researches and developments have been devoted to apparatuses for preventing unauthorized access to networks.

For example, Unexamined Japanese Patent Application KOKAI Publication No. 2002-73433 proposes an apparatus for determining detection of intrusion from a packet, taking measures such as disconnecting communication if an unauthorized packet is detected, and automatically lifting disconnection of communication if no unauthorized packet is detected.

Unexamined Japanese Patent Application KOKAI Publication No. 2003-99339 proposes an apparatus using a filter-type IDS (Intrusion Detection System) function, which can immediately cut a possibly offensive IP (Internet Protocol) packet and can also cut IP packets which are addressed in mass to the IDS function as detected.

However, conventional network unauthorized access preventing apparatuses as described above have the following problems.

In case of an apparatus for preventing unauthorized access by its hubs performing filtering at the time of detecting an intrusion, each hub must be equipped with the function of filtering, which increases costs.

This is true not only in a case where a hub determines whether it is an intrusion based on the IP address of the packet sender but also in a case where, as done by the apparatus proposed in Unexamined Japanese Patent Application KOKAI Publication No. 2002-73433, a packet itself is analyzed to determine whether it is an intrusion.

Further, in a case where a plurality of hubs are used in a network and the hubs are provided by different companies, the filtering functions and managing procedures of the hubs are varied from company to company. It is therefore necessary to prepare managing means applicable to the respective types of hubs, which further increases costs.

There is an apparatus which prevents unauthorized access by changing the settings of a VPN (Virtual Private Network) apparatus or firewall at the time of detecting an intrusion. However, although able to prevent unauthorized access from the outside, such an apparatus has a problem that it cannot prevent unauthorized access inside the network.

Further, there is an apparatus which prevents unauthorized access by sending a TCP (Transmission Control Protocol) reset packet at the time of detecting an intrusion. According to such an apparatus, if the intruder's protocol is such a protocol as HTTP (Hyper Text Transfer Protocol) by which data transmission is completed in a short time, the intruder's data is completely transmitted at the time the reset packet is sent. Thus, there is a problem that prevention of unauthorized access does not work in time.

SUMMARY OF THE INVENTION

The present invention was made in view of the above circumstances, and an object of the present invention is to realize prevention of unauthorized access for an entire network, by installing only one network unauthorized access preventing apparatus on the network.

Another object of the present invention is to provide a network unauthorized access preventing system and network unauthorized access preventing apparatus which can use a single managing procedure, be prepared at low costs, prevent unauthorized access inside a network, and is effective on a protocol by which data transmission is completed in a short time.

To achieve the above objects, a network unauthorized access preventing system according to the present invention is a network unauthorized access preventing system which prevents an unauthorized apparatus, which is not authorized to access a network, from accessing one or more information processing apparatuses connected to the network, and comprises a network unauthorized access preventing apparatus which sends an ARP response packet containing a false MAC address as the MAC address of the information processing apparatus to the unauthorized apparatus, after the information processing apparatus sends a correct ARP response packet to the unauthorized apparatus in response to an ARP request which is broadcast from the unauthorized apparatus.

By configuring the network unauthorized access preventing system in this manner, it is possible to prevent an unauthorized apparatus, which is an information processing apparatus unauthorized to access the network, from accessing the network and access an information processing apparatus in the network.

That is, according to present invention, since an unauthorized apparatus which attempts to access an internal server in the network accesses the internal server by using a false MAC address which does not exist in the network as the MAC address of the internal server, the unauthorized apparatus fails in access.

Therefore, it is possible to prevent theft or falsification of data stored in the internal server in the network and distribution of viruses by the unauthorized apparatus.

Further, since the present invention employs a system which is not dependent on hardware such as router and hub, it can be applied to networks of any types of configuration.

Furthermore, since there is no need of installing routers and hubs having an unauthorized access preventing function in the network, it is possible to achieve prevention of unauthorized access while reducing the costs required for the entire system.

In addition to personal computers and servers, the information processing apparatus includes various apparatuses such as printers, scanners, facsimile machines, etc., having an information processing function. In the following explanation, the information processing apparatus may be referred to as apparatus in some case.

The network unauthorized access preventing system according to the present invention is configured such that the network unauthorized access preventing apparatus: comprises an authorization list storage unit which stores a MAC address of an information processing apparatus which is authorized to access the network; collects all packets transmitted via the network in an indiscriminate reception mode; determines whether or not a MAC address of a packet sender which is contained in a collected packet is registered in the authorization list storage unit, and detects the packet sender of this packet as the unauthorized apparatus. In a case where the MAC address is not registered in the authorization list storage unit; sets a predetermined designation time when receiving the ARP request; in a case where the correct ARP response packet is sent to the unauthorized apparatus from the information processing apparatus regardless of whether it is before or after the designation time elapses, receives the correct ARP response packet and sends the ARP response packet containing the false MAC address to the unauthorized apparatus immediately after receiving the correct ARP response packet; and in a case where not receiving the correct ARP response packet before the designation time elapses, sends the ARP response packet containing the false MAC address to the unauthorized apparatus when the designation time elapses.

By configuring the network unauthorized access preventing system in this manner, the network unauthorized access preventing apparatus can send the false ARP response packet to the unauthorized apparatus at a more appropriate timing.

That is, since the information processing apparatus such as an internal server which receives the ARP request from the unauthorized apparatus and thus is the target of access by the unauthorized apparatus sends an ARP response packet containing a correct MAC address to the unauthorized apparatus, it is preferred that the correct MAC address retained by the unauthorized apparatus be rewritten to a false MAC address immediately after the ARP response packet containing the correct MAC address is sent to the unauthorized apparatus.

Therefore, the network unauthorized access preventing apparatus, which receives by an indiscriminate reception mode, the ARP response packet containing the correct MAC address which is sent to the unauthorized apparatus from the information processing apparatus, sends the ARP response packet containing the false MAC address to the unauthorized apparatus immediately after it receives the ARP response packet containing the correct MAC address.

However, there might be a case where the network unauthorized access preventing apparatus fails in receiving the ARP response packet containing the correct MAC address which is sent to the unauthorized apparatus from the information processing apparatus.

In this case, by setting a false MAC address as the MAC address of the information processing apparatus in the unauthorized apparatus when the predetermined designation time elapses, it is possible to prevent unauthorized access more securely.

Further, there might be a case where sending of the ARP response packet containing the correct MAC address to the unauthorized apparatus is delayed due to a process delay caused in the internal server, and therefore the predetermined designation time elapses. Even in this case, since the network unauthorized access preventing apparatus sends the ARP response packet containing the false MAC address to the unauthorized apparatus each time the ARP response packet containing the correct MAC address is sent to the unauthorized apparatus, the unauthorized apparatus becomes unable to unauthorizedly access the internal server again.

The expression "when receiving the ARP request" is not meant to strictly limit this time of reception to when the unauthorized apparatus preventing apparatus receives the ARP request, but may be considered as a time when an information processing apparatus, which has sent an ARP request, is detected as the unauthorized apparatus. That is, the expression "when receiving the ARP request" designates the timing the network unauthorized access preventing apparatus receives the ARP request from the unauthorized apparatus in a broad range. This applies to the following explanation.

The network unauthorized access preventing system according to the present invention is configured such that the network unauthorized access preventing apparatus: sends an ARP response packet containing a false MAC address as a MAC address of the information processing apparatus to the unauthorized apparatus; and at the same time, sends an ARP response packet containing a false MAC address as a MAC address of the unauthorized apparatus to the information processing apparatus.

By configuring the network unauthorized access preventing apparatus in this manner, even in a case where the correct MAC address of the information processing apparatus, which is the target of unauthorized access, is set in the unauthorized apparatus by manual input or the like, authorized access can be prevented.

That is, according to the present invention, an ARP response packet containing a false MAC address as the MAC address of the unauthorized apparatus is sent to the information processing apparatus. Therefore, when the information processing apparatus sends a response to the unauthorized apparatus, the response packet can be prevented from being sent to the unauthorized apparatus, making it possible to more securely prevent unauthorized access by the unauthorized apparatus.

The network unauthorized access preventing system according to the present invention is configured such that the network unauthorized access preventing apparatus: sends an ARP response packet containing a false MAC address as a MAC address of the information processing apparatus to the unauthorized apparatus, and at the same time, sends an ARP response packet containing a false MAC address as a MAC address of the unauthorized apparatus to all information processing apparatuses existing in a same subnet as the information processing apparatus.

By configuring the network unauthorized access preventing system in this manner, even in a case where the unauthorized apparatus attempts to access another information processing apparatus existing in the same subnet as the information processing apparatus which is the target of unauthorized access, it is possible to prevent this access.

That is, according to the present invention, not only an ARP response packet containing a false MAC address as the MAC address of the information processing apparatus is sent to the unauthorized apparatus, but also an ARP response packet containing a false MAC address as the MAC address of the unauthorized apparatus is sent to all information processing apparatuses that exist in the same subnet.

Therefore, when all the information processing apparatuses existing in the same subnet try to return a response to the unauthorized apparatus, it is possible to prevent the response packet from being sent to the unauthorized apparatus, making it possible to more securely prevent unauthorized access by the unauthorized apparatus.

The network unauthorized access preventing apparatus according to the present invention comprises an external information processing apparatus which is connected to the network via a relay apparatus, and is configured such that the network unauthorized access preventing apparatus:

comprises a relay apparatus list storage unit which stores a MAC address of a relay apparatus connected to the network;

determines whether the unauthorized apparatus attempts to access an information processing apparatus existing in the network or attempts to access an external information processing apparatus existing in an external network based on an IP address of an information processing apparatus which the unauthorized apparatus attempts to access which IP address is contained in the ARP request, and in a case where the unauthorized apparatus attempts to access an external information processing apparatus existing in an external network;

sends an ARP response packet containing a false MAC address as a MAC address of the relay apparatus to the unauthorized apparatus; and sends an ARP response packet containing a false MAC address as a MAC address of the unauthorized apparatus to all relay apparatuses whose physical address is stored in the relay apparatus list storage unit.

By configuring the network unauthorized access preventing system in this manner, in a case where the unauthorized apparatus attempts to access an external information processing apparatus existing in an external network via a relay apparatus such as a router in the network, it is possible to prevent this attempt.

That is, the network unauthorized access preventing apparatus determines whether the information processing apparatus which the unauthorized apparatus attempts to access exist in an external network based on the request sent from the unauthorized apparatus, in a case where such an information processing apparatus exists in an external network, sends an ARP response packet containing a false MAC address as the MAC address of the relay apparatus to the unauthorized apparatus, and at the same time, sends an ARP response packet containing a false MAC address as the MAC address of the unauthorized apparatus to all relay apparatuses in the internal network.

Because of this, packet sending by the unauthorized apparatus to the relay apparatus is prevented and packet sending by the relay apparatus to the unauthorized apparatus is also prevented. Therefore, the unauthorized apparatus cannot access the external information processing apparatus, and it is possible to more securely prevent unauthorized access to the network by the unauthorized apparatus.

A network unauthorized access preventing system according to the present invention is a network unauthorized access preventing system which prevents an unauthorized apparatus, which is not authorized to access a network, from accessing one or more information processing apparatuses connected to the network, and comprise a network unauthorized access preventing apparatus which: collects all packets transmitted via the network in an indiscriminate reception mode to determine whether each packet is an ARP packet, determines whether or not a MAC address of a packet sender which is contained in a collected ARP packet is registered in an authorization list storage unit for storing a MAC address of an information processing apparatus authorized to access the network, and detects the packet sender of this ARP packet as the unauthorized apparatus in a case where the MAC address of the packet sender is not registered; registers an IP address and MAC address of the unauthorized apparatus in an un-authorization list storage unit for storing an IP address and MAC address of an information processing apparatus unauthorized to access the network; and broadcasts an ARP response packet containing a false MAC address as a MAC address of each of all unauthorized apparatuses that are registered in the un-authorization list storage unit.

By configuring the network unauthorized access preventing system in this manner, even in a case where the unauthorized apparatus attempting unauthorized access receives an ARP packet sent for communicating with the internal server by an information processing apparatus authorized to access the network, it is possible to prevent the unauthorized apparatus from accessing the internal server.

That is, when the network unauthorized access preventing apparatus receives an ARP packet, and if this ARP packet is sent from the unauthorized apparatus, the network unauthorized access preventing apparatus registers the IP address and MAC address of the unauthorized apparatus on the un-authorization list. Then, the network unauthorized access preventing apparatus broadcasts ARP response packets spoofing the MAC addresses of all unauthorized apparatuses registered on the un-authorization list, thereby making it possible to prevent the unauthorized apparatus from communicating with all apparatuses existing in the same subnet.

A network unauthorized access preventing apparatus according to the present invention is a network unauthorized access preventing apparatus which prevents an unauthorized apparatus, which is not authorized to access a network, from accessing one or more information processing apparatuses in the network, and comprises:

an authorization list storage unit which stores a MAC address of an information processing apparatus which is authorized to access the network;

a packet collection unit which collects all packets transmitted via the network in an indiscriminate reception mode;

an access authorization determination unit which determines whether a MAC address of a packet sender which is contained in a collected packet is registered in the authorization list storage unit, and detects the packet sender of this packet as the unauthorized apparatus in a case where the MAC address is not registered; and a false packet sending unit which sends an ARP response packet containing a false MAC address as a MAC address of the information processing apparatus to the unauthorized apparatus, after a correct ARP response packet is sent to the unauthorized apparatus from the information processing apparatus in response to an ARP request which is broadcast from the unauthorized apparatus.

By configuring the network unauthorized access preventing apparatus in this manner, by sending an ARP response packet containing a false MAC address to the unauthorized apparatus from the network unauthorized access preventing apparatus after an ARP response packet containing a correct MAC address is sent to the unauthorized apparatus from the information processing apparatus in response to an ARP request broadcast form the unauthorized apparatus, it is possible to rewrite the ARP table in the unauthorized apparatus.

Because of this, the unauthorized apparatus becomes unable to send a packet to the information processing apparatus, making it possible to prevent the unauthorized apparatus from unauthorizedly accessing the information processing apparatus.

The network unauthorized access preventing apparatus according to the present invention is configured such that the false packet sending unit: sets a predetermined designation time when the network unauthorized access preventing apparatus receives the ARP request; in a case where the correct ARP response packet is sent to the unauthorized apparatus from the information processing apparatus regardless of whether it is before or after the designation time elapses, sends the ARP response packet containing the false MAC address to the unauthorized apparatus immediately after the network unauthorized access preventing apparatus receives the correct ARP response packet; and in a case where the network unauthorized access preventing apparatus does not receive the correct ARP response packet before the designation time elapses, sends the ARP response packet containing the false MAC address to the unauthorized apparatus when the designation time elapses.

By configuring the network unauthorized access preventing apparatus in this manner, even in a case where the network unauthorized access preventing apparatus cannot receive the ARP response packet containing the correct MAC address from the information processing apparatus, it is possible to register a false MAC address as the MAC address of the information processing apparatus in the ARP table of the unauthorized apparatus.

Because of this, it is possible to prevent access by the unauthorized apparatus to the information processing apparatus, and to further improve the effect of preventing unauthorized access.

The network unauthorized access preventing apparatus according to the present invention is configured such that the false packet sending unit: sends an ARP response packet containing a false MAC address as a MAC address of the information processing apparatus to the unauthorized apparatus; and at the same time, sends an ARP response packet containing a false MAC address as a MAC address of the unauthorized apparatus to the information processing apparatus.

By configuring the network unauthorized access preventing apparatus in this manner, not only the unauthorized apparatus becomes unable to send a packet to the information processing apparatus, but also the information processing apparatus becomes unable to send a packet to the unauthorized apparatus, making it possible to more securely prevent unauthorized access.

The network unauthorized access preventing apparatus according to the present invention is configured such that the false packet sending unit: sends an ARP response packet containing a false MAC address as a MAC address of the information processing apparatus to the unauthorized apparatus; and at the same time, sends an ARP response packet containing a false MAC address as a MAC address of the unauthorized apparatus to all information processing apparatuses that exist in a same subnet as the information processing apparatus.

By configuring the network unauthorized access preventing apparatus in this manner, not only the unauthorized apparatus becomes unable to send a packet to the information processing apparatus, but also all information processing apparatuses that exist in the same subnet as the information processing apparatus become unable to send a packet to the unauthorized apparatus.

Because of this, in a case where the unauthorized apparatus attempts to access one information processing apparatus in the network, it becomes unable to receive a packet from all information processing apparatuses that exist in the same subnet, enhancing the prevention of unauthorized access to the network by the unauthorized apparatus.

The network unauthorized access preventing apparatus according to the present invention comprises a relay apparatus list storage unit which stores a MAC address of a relay apparatus connected to the network; and a network determination unit which determines whether the unauthorized apparatus attempts to access an information processing apparatus existing in the network or attempts to access an external information processing apparatus existing in an external network based on an IP address of an information processing apparatus which the unauthorized apparatus attempts to access which IP address is contained in the request, and is configured such that in a case where the unauthorized apparatus attempts to access an external information processing unit existing in an external network, the false packet sending unit:

sends an ARP response packet containing a false MAC address as a MAC address of the relay apparatus to the unauthorized apparatus; and sends an ARP response packet containing a false MAC address as a MAC address of the unauthorized apparatus to all relay apparatuses whose MAC address is stored in the relay apparatus list storage unit.

By configuring the network unauthorized access preventing apparatus in this manner, in a case where the unauthorized apparatus attempts to unauthorizedly access an information processing apparatus in an external network via a relay apparatus such as a router, it is possible to make it impossible to send a packet from the relay apparatus to the unauthorized apparatus.

Because of this, it is possible to more effectively prevent unauthorized access to the network by the unauthorized apparatus.

A network unauthorized access preventing apparatus according to the present invention is a network unauthorized access preventing apparatus which prevents an unauthorized apparatus, which is not authorized to access a network, from accessing one or more information processing apparatuses connected to the network, and comprises: an authorization list storage unit which stores a MAC address of an information processing apparatus which is authorized to access the network; an un-authorization list storage unit which stores an IP address and MAC address of an information processing apparatus which is not authorized to access the network; a packet collection unit which collects all packets transmitted via the network in an indiscriminate reception mode; an access authorization determination unit which determines whether a collected packet is an ARP packet in a case where it is an ARP packet, determines whether a MAC address of a packet sender contained in this ARP packet is registered in the authorization list storage unit, in a case where the MAC address is not registered, detects the packet sender of this ARP packet as the unauthorized apparatus, and registers an IP address and MAC address of the unauthorized apparatus in the un-authorization list storage unit; and a false packet sending unit which broadcasts an ARP response packet containing a false MAC address as a MAC address of each of all unauthorized apparatuses that are registered in the un-authorization list storage unit.

By configuring the network unauthorized access preventing apparatus in this manner, since an ARP response packet spoofing the MAC address of the unauthorized apparatus can be broadcast based on the un-authorization list on which unauthorized apparatuses which are not authorized to access the network are registered, it is possible to prevent the unauthorized apparatus from communicating with all apparatuses that exist in the same subnet.

According to the present invention, it is possible to prevent an unauthorized apparatus such as a personal computer which is not authorized to access a network, from accessing an internal server or other apparatuses existing in the same subnet. Further, it is possible to prevent the unauthorized apparatus from accessing an apparatus in an external network via router or the like.

Because of this, it is possible to prevent data theft, data falsification, virus distribution, etc. by the unauthorized apparatus. Further, it is possible to prevent deterioration of security of an in-house system due to connection of an individual computer to the in-house network.

Conventionally, prevention of unauthorized access using a reset packet does not work in time on a protocol by which data transmission can be completed in a short time, because data transmission is already completed at the time the reset packet is sent. However, according to the present invention, such a problem does not occur.

Furthermore, according to the present invention, prevention of unauthorized access is realized by employing a system which is not dependent on hardware such as routers and hubs. Therefore, the present invention is applicable to various environments flexibly without being limited by network configurations. Further, since there is no need of installing routers and hubs which are equipped with an unauthorized access preventing function, it is possible to reduce costs required for the entire system.

BRIEF DESCRIPTION OF THE DRAWINGS

These objects and other objects and advantages of the present invention with become more apparent upon reading of the following detailed description and the accompanying drawings in which.

DETAILED DESCRIPTION OF THE PREFERRED EMBODIMENTS

The embodiments of the present invention will now be explained with reference to the drawings.

First Embodiment

Figure 1:
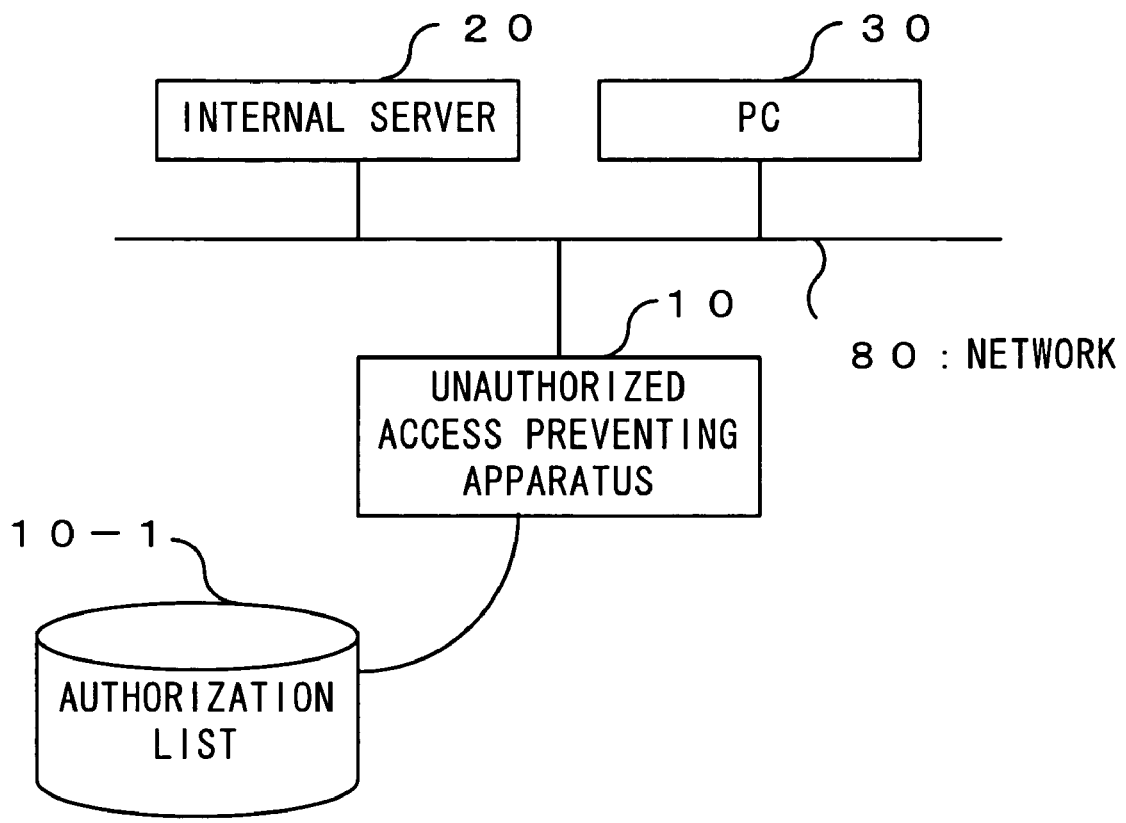
FIG. 1 is a block diagram showing the configuration of a network unauthorized access preventing system according to a first embodiment of the present invention.
Figure 2:
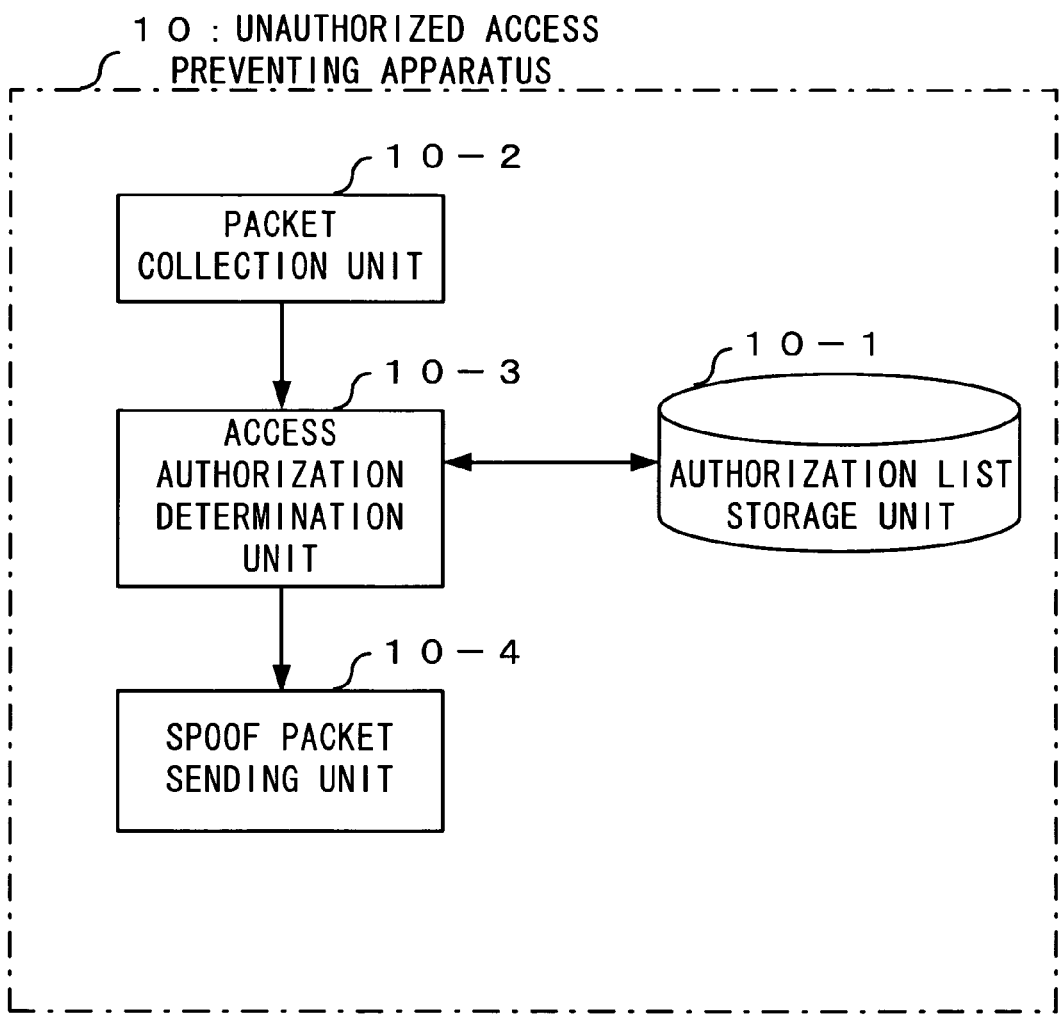
FIG. 2 is a block diagram showing the configuration of a network unauthorized access preventing apparatus in the network unauthorized access preventing system according to the first embodiment of the present invention.

The configuration of the first embodiment of the present invention will now be explained with reference to FIG. 1 and FIG. 2. FIG. 1 is a block diagram showing the configuration of a network unauthorized access preventing system according to the present embodiment FIG. 2 is a block diagram showing the configuration of a network unauthorized access preventing apparatus in the system.

As shown in FIG. 1, the network unauthorized access preventing system according to the present embodiment comprises a network unauthorized access preventing apparatus 10, an authorization list 10-1, an internal server 20, and a network 80. A PC 30 is now attempting to unauthorizedly access the network 80.

The network unauthorized access preventing apparatus 10 prevents an apparatus, which is not authorized to access a network, from invalidly accessing the network, based on the authorization list 10-1 containing information on apparatuses that are not authorized to access the network.

When the PC 30, which is invalidly accessing the network 80, accesses the internal server 20, the network unauthorized access preventing apparatus 10 sends an ARP response packet spoofing an MAC (Media Access Control) address (physical address) of the internal server 20 to the PC 30 and rewrites an ARP table of the PC 30.

As shown in FIG. 2, the network unauthorized access preventing apparatus 10 comprises an authorization list storage unit 10-1 (authorization list 10-1), a packet collection unit 10-2, an access authorization determination unit 10-3, and a spoof packet sending unit 10-4.

The authorization list storage unit 10-1 is a storage device storing an MAC address 10 of an apparatus which is authorized to access the network. The authorization list is pre-stored in the network unauthorized access preventing apparatus 10. According to the present embodiment, it is assumed that the MAC address of the PC 30 is not registered in the authorization list storage unit 10-1.

The authorization list storage unit 10-1 needs not to be contained inside the network unauthorized access preventing apparatus 10, but may be prepared as an external storage device.

The packet collection unit 10-2 collects all packets that circulate through the network 80 in an indiscriminate reception mode, and supplies the collected packets to the access authorization determination unit 10-3.

The access authorization determination unit 10-3 refers to the authorization list storage unit 10-1 based on the MAC addresses of the senders included in the packets collected by the packet collection unit 10-2, and determines whether or not the packet senders' apparatuses are authorized to access the network 80.

In a case where a sender's MAC address is not in the authorization list storage unit 10-1, the access authorization determination unit 10-3 detects the packet sender's apparatus as an unauthorized apparatus that is not permitted to access the network 80. The access authorization determination unit 10-3 notifies the packet to the spoof packet sending unit 10-4.

The spoof packet sending unit 10-4 sends a spoof packet for preventing unauthorized access to the network, to the unauthorized apparatus.

The internal server 20 is an information processing apparatus which receives a request from the PC 30 and sends a response to the PC 30.

The PC 30 is an information processing apparatus which invalidly accesses the network 80 and attempts to access the internal server 20 or the like.

The network 80 may be an arbitrary suitable public line, commercial line, or private line which is conventionally publicly known. The network 80 is a line that can connect the network unauthorized access preventing apparatus 10, the internal server 20, and the PC 30 with each other by radio or by cable. The network 80 may be constituted by, for example, a public line network, a private line network, the Internet, and an intranet network.

A process procedure of the network unauthorized access preventing system according to the present embodiment will now be explained with reference to FIG. 3.

Figure 3:
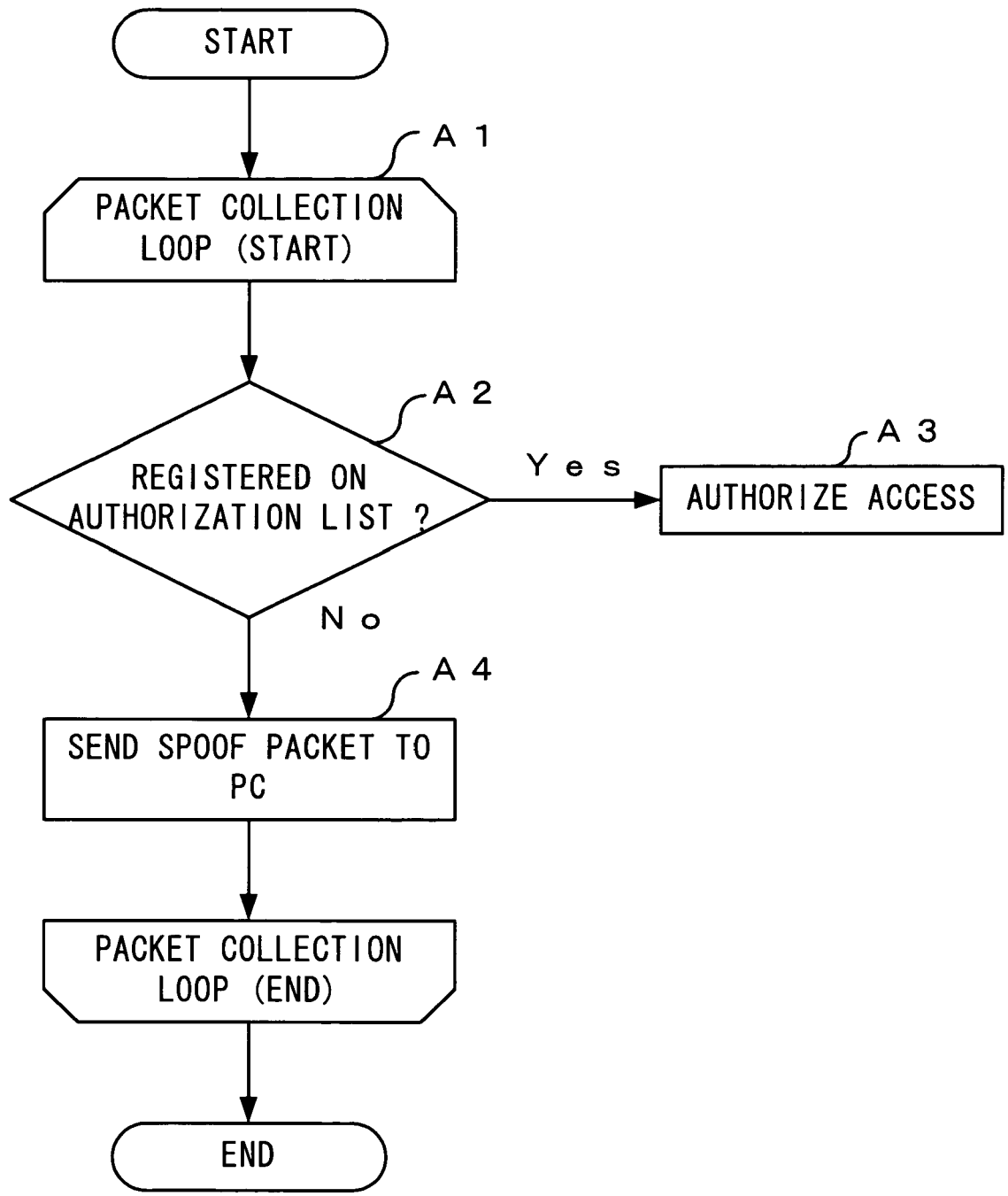
FIG. 3 is a flowchart showing a process procedure of the network unauthorized access preventing system according to the first embodiment of the present invention.

FIG. 3 is a flowchart showing the process procedure of the network unauthorized access preventing system according to the present embodiment.

First, the packet collection unit 10-2 of the network unauthorized access preventing apparatus 10 collects all packets circulating through the network in an indiscriminate reception mode by starting a packet collection loop (step A1). When an ARP request (packet) for accessing the internal server 20 is broadcast from the PC 30, this ARP request is also collected in step A1.

Next, the access authorization determination unit 10-3 checks whether an MAC address of the apparatus that has sent the received packet is registered on the authorization list 10-1. By doing this, the access authorization determination unit 10-3 determines whether the sender apparatus is one that is authorized to access the network (step A2).

In a case where the MAC address of the apparatus that has sent the received packet is registered on the authorization list 10-1 (step A2: Yes), the network unauthorized access preventing apparatus 10 does not prevent the apparatus from accessing the network (step A3).

In a case where the MAC address of the apparatus that has sent the received packet is not registered on the authorization list 10-1 (step A2: No), the network unauthorized access preventing apparatus 10 sends a spoof packet for preventing unauthorized access to the network, to the apparatus (step A4).

By this, it is possible to prevent the PC 30, whose MAC address is not registered on the authorization list 10-1, from communicating with the internal server 20.

Assume that the MAC address and IP address of the internal server 20 are Ms and Is respectively, and an MAC address which does not exist in the network is Mx. In this case, by sending an ARP response packet indicating that the MAC address that corresponds to the IP address Is is Mx to the PC 30, prevention of unauthorized access using a spoof packet is realized.

That is, the network unauthorized access preventing apparatus 10 sends such an ARP response packet to the PC 30. As a result, the PC 30 will thereafter send a packet to the address Mx as an MAC address corresponding to the IP address Is, when attempting to send a packet to the internal server 20. That is, by sending an ARP response packet, a packet from the PC 30 is prevented from reaching the internal server 20.

Next, a timing to send a spoof packet to the PC 30 will be explained in detail.

The PC 30, the internal server 20, and the network unauthorized access preventing apparatus 10 communicate with each other in the following order.

(1) The PC 30 broadcasts an ARP request for communicating with the internal server 20 to the network 80.

(2) The internal server 20 sends a correct ARP response packet (IP address: Is, MAC address: Ms) to the PC 30.

(3) The network unauthorized access preventing apparatus 10 sends a spoof ARP response packet (IP address: Is, MAC address: Mx) to the PC 30, thereby rewriting an ARP table in the PC 30.

In principle, the network unauthorized access preventing apparatus 10 sends the packet of (3) as triggered by the packet of (2). Other than this pattern, the network unauthorized access preventing apparatus 10 sends the packet of (3) by the following operation.

First, the network unauthorized access preventing apparatus 10 sets a predetermined designation time at a timing of receiving the packet of (1)

Then, in a case where receiving the packet of (2) before the designation time elapses, the network unauthorized access preventing apparatus 10 immediately sends the packet of (3) to the PC 30.

In a case where the designation time elapses without receiving the packet of (2), the network unauthorized access preventing apparatus 10 sends the packet of (3) to the PC 30 when the designation time elapses. In this case, there is a problem that the PC 30 becomes able to communicate with the internal server 20, because the packet of (2) might be sent to the PC 30 after the packet of (3) is sent thereto. However, since the network unauthorized access preventing apparatus 10 immediately sends the packet of (3) each time it receives the packet of (2), it can prevents the PC 20 from again communicating with the internal server 20.

The network unauthorized access preventing apparatus 10 can know whether the packet it receives is the packet of (2) or not, by checking whether the IP address of the addressee in the packet of (1) is the ARP response packet set in the IP address of the addressor. It is preferred that this operation be performed by either the access authorization determination unit 10-3 or the spoof packet sending unit 10-4.

The above-described process timings are employable in the following embodiments in which the target of the PC 30 to invalidly communicate with is different from that in the present embodiment.

Second Embodiment

Figure 4:
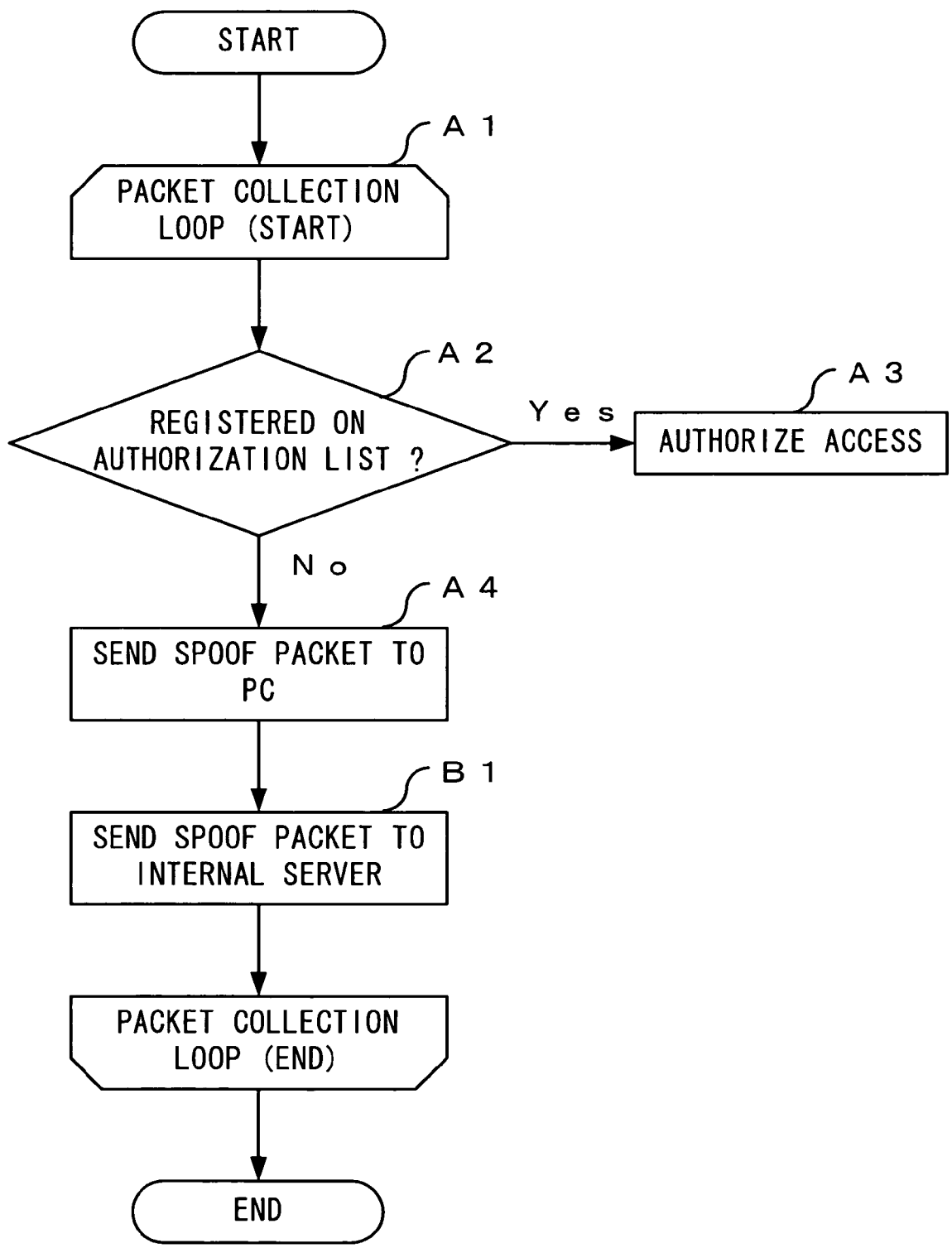
FIG. 4 is a flowchart showing a process procedure of a network unauthorized access preventing system according to a second embodiment of the present invention.

The second embodiment of the sent invention will now be explained with reference to FIG. 4. FIG. 4 is a flowchart showing a process procedure in a network unauthorized access preventing system according to the present embodiment.

The present embodiment is different from the first embodiment in that the system of the present embodiment can deal with a case where the MAC address Ms of the internal server 20 is statically set in the PC 30.

That is, according to the first embodiment, prevention of unauthorized access is realized by cheating the PC 30 that invalidly accesses the network. However, in a case where the MAC address Ms of the internal server 20 is correctly reset in the PC 3 by, for example, manual input, the PC 30 can again send a packet to the internal server 20.

To solve this problem, the present embodiment is improved in the algorithm employed in the first embodiment.

The configuration of the network unauthorized access preventing system of the first embodiment shown in FIG. 1 and FIG. 2 can be employed as that of the network unauthorized access preventing system of the present embodiment. However, the spoof packet sending unit 10-4 of the network unauthorized access preventing apparatus 10 of the present embodiment not only sends a spoof packet to the PC 30, but also sends a spoof packet to the internal server 20. The other components of the network unauthorized access preventing system are the same as those in the first embodiment.

Steps A1 to A4 shown in FIG. 4 are the same as those in the first embodiment shown in FIG. 3.

However, according to the present embodiment, in addition to sending the same spoof packet as that in the first embodiment to the PC 30 (step A4), the network unauthorized access preventing apparatus 10 sends a spoof packet to the internal server 20 (step B1).

Due to this, when the internal server 20 returns a response to the PC 30, this response packet is prevented from being returned to the PC 30, making it possible to more securely prevent unauthorized access by the PC 30.

When it is assumed that the MAC address and IP address of the PC 30 are Mp and Ip respectively, the spoof packet to be sent to the internal server 20 in step B1 is an ARP response packet indicating that the MAC address that corresponds to the IP address Ip is Mx.

Due to this, thereafter, when the internal server 20 tries to send a response packet to the PC 30, it sends the response packet to the address. Mx as the MAC address corresponding to the IP address Ip, making it possible to prevent the response packet from arriving at the PC 30.

Third Embodiment

Figure 5:
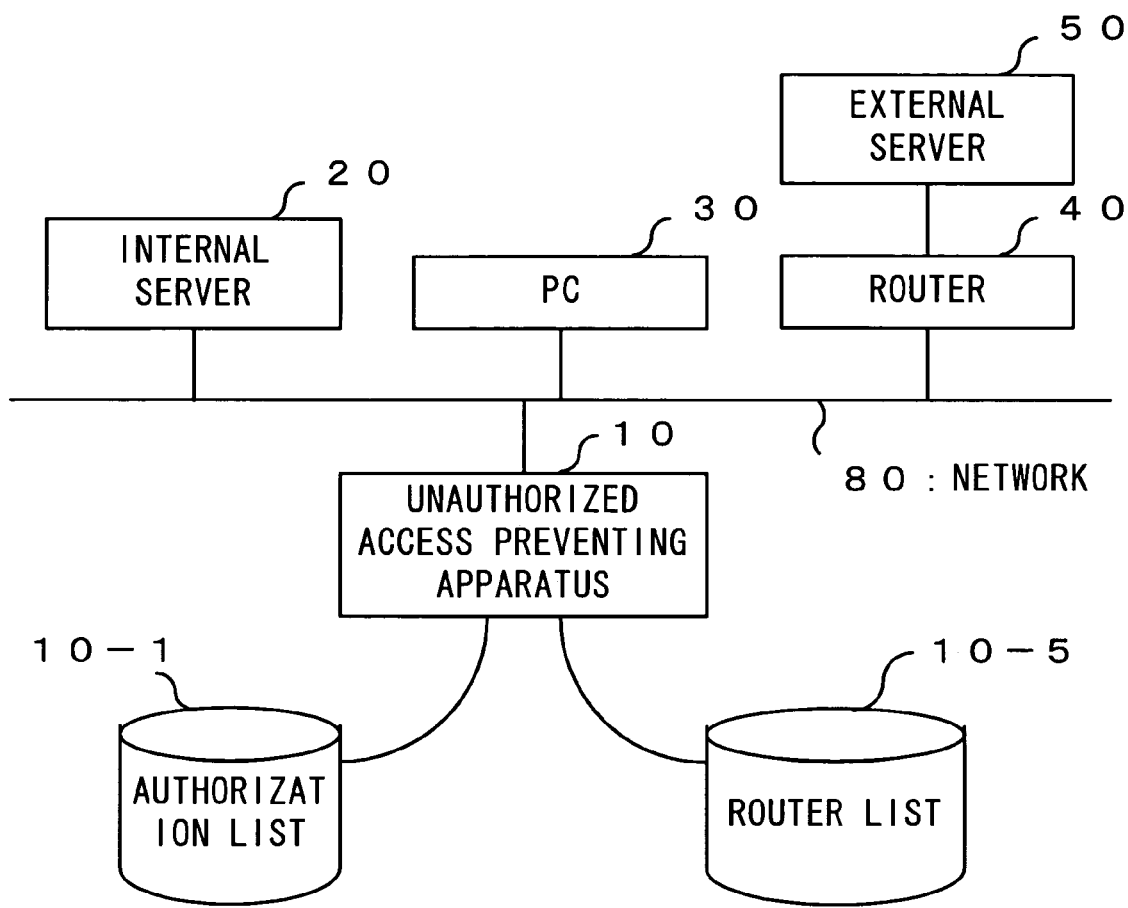
FIG. 5 is a block diagram showing the configuration of a network unauthorized access preventing system according to a third embodiment of the present invention.
Figure 6:
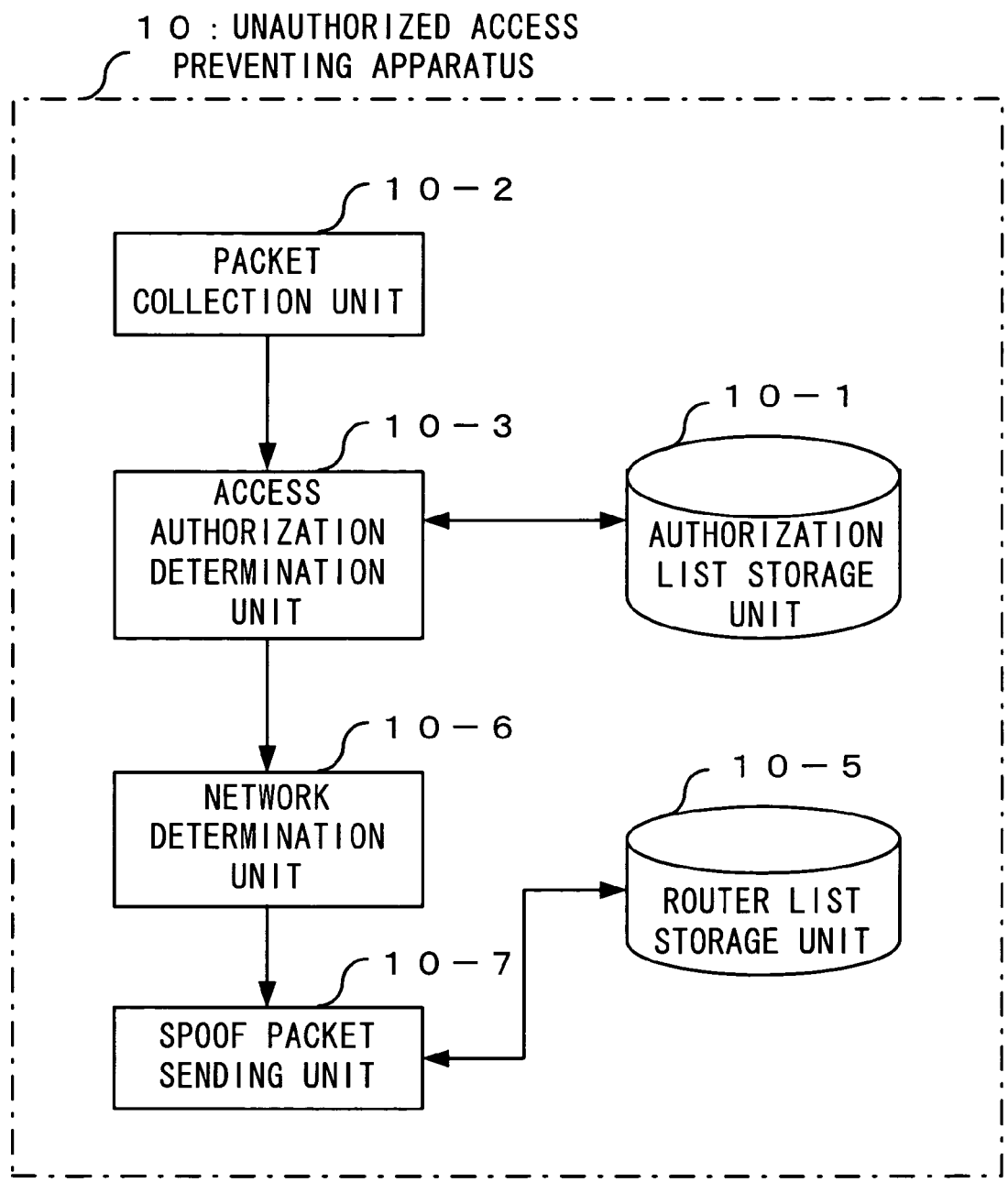
FIG. 6 is a block diagram showing the configuration of a network unauthorized access preventing apparatus in the network unauthorized access preventing system according to the third embodiment of the present invention.

Next, the third embodiment of the present invention will be explained with reference to FIG. 5 and FIG. 6. FIG. 5 is a block diagram showing the configuration of a network unauthorized access preventing system according to the present embodiment. FIG. 6 is a block diagram showing the configuration of a network unauthorized access preventing apparatus in the network unauthorized access preventing system according to the present embodiment.

The present embodiment is different from the second embodiment in that the system of the present embodiment can prevent unauthorized access even in a case where the invalidly accessing PC 30 attempts to access an external server 50 via a router 40.

That is, according to the second embodiment, the system can prevent authorized access inside the network. As shown in FIG. 5, in a case where the invalidly accessing PC 30 attempts to communicate with the external server 50 via the router 40, its packet is sent to the MAC address of the router 40 not of the external server 50. Therefore, it is meaningless to spoof the MAC address of the external server 50 using the algorithms of the first and second embodiments.

To solve this problem, the present embodiment is improved in the algorithm employed in the second embodiment.

As shown in FIG. 6, the network unauthorized access preventing apparatus 10 of the present embodiment comprises an authorization list storage unit 10-1, a packet collection unit 10-2, an access authorization determination unit 10-3, a router list storage unit 10-5 (router list 10-5), a network determination unit 10-6, and a spoof packet sending unit 10-7.

The authorization list storage unit 10-1, the packet collection unit 10-2, and the access authorization determination unit 10-3 are the same as those shown in FIG. 2.

The router list storage unit 10-5 is a storage device that stores an MAC address of a router which is connected to the network 80. This router list is pre-stored in the network unauthorized access preventing apparatus 10, likewise the authorization list.

The router list storage unit 10-5 needs not to be included in the network unauthorized access preventing apparatus 10, but may be prepared as an external storage device, likewise the authorization list storage unit 10-1.

When the PC 30 is detected as an unauthorized apparatus by the access authorization determination unit 10.3, the network determination unit 10-6 determines whether the communication partner of the PC 30 exists in the internal network and notifies the determination result together with packet information to the spoof packet sending unit 10-7. The determination of whether the communication partner exists in the internal network can be done by determining whether the packet sender's IP address in the ARP request broadcast by the PC 30 is an address of the same subnet as the IP address of the communication partner.

In a case where the communication partner of the PC 30 is an apparatus in the internal network, the spoof packet sending unit 10-7 sends a spoof packet to the PC 30 while also sending a spoof packet to the internal server 20, likewise in the second embodiment.

In a case where the communication partner of the PC 30 is an apparatus in an external network, the spoof packet sending unit 10-7 sends a spoof packet to the PC 30, and also sends a spoof packet to all the routers that are registered in the router list storage unit 10-5.

Next, a process procedure of the network unauthorized access preventing system according to the present embodiment will be explained with reference to FIG. 7.

Figure 7:
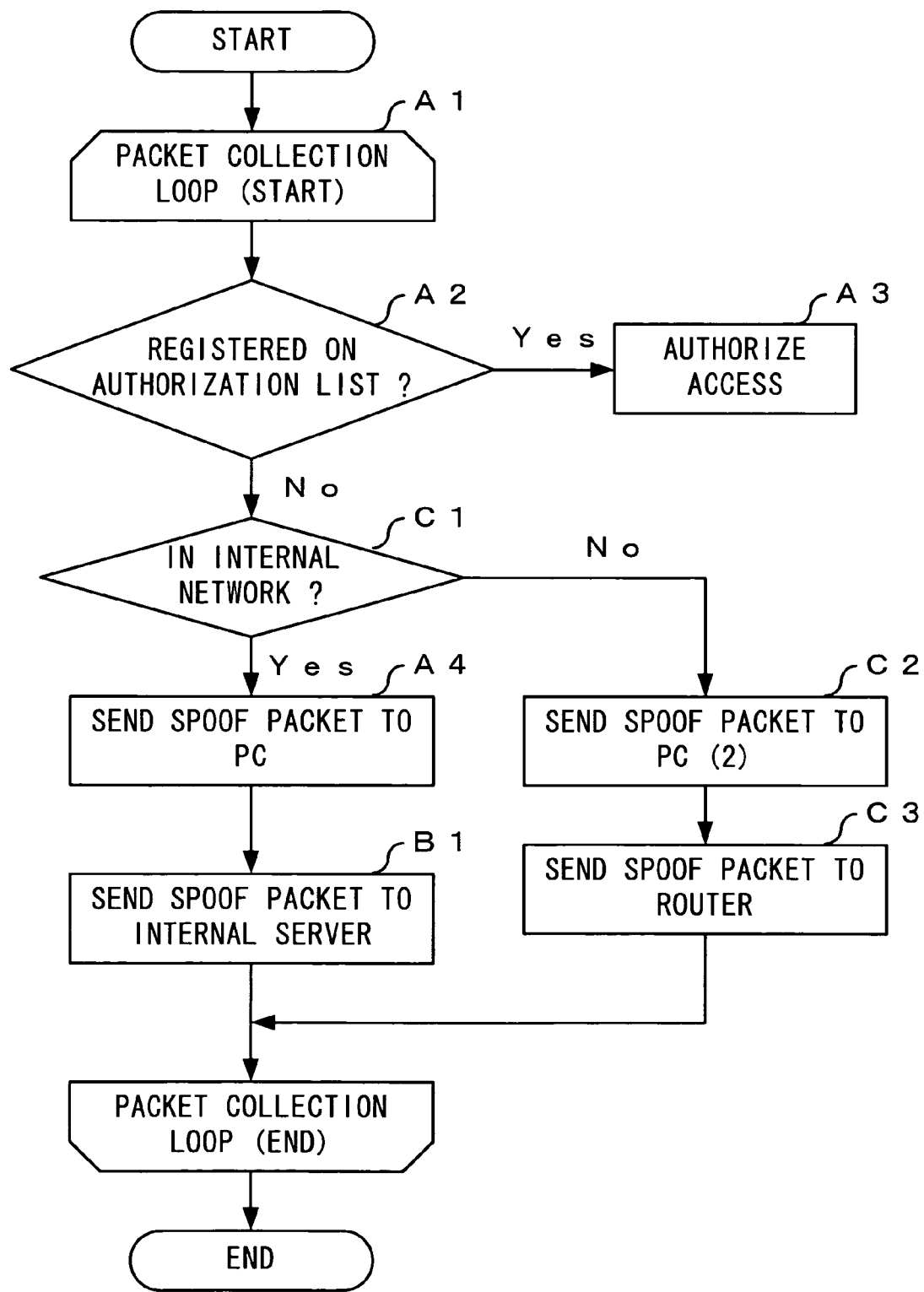
FIG. 7 is a flowchart showing a process procedure of the network unauthorized access preventing system according to the third embodiment of the present invention.

FIG. 7 is a flowchart showing the process procedure of the network unauthorized access preventing system according to the present embodiment.

In FIG. 7, steps A1 to A3 are the same as those of the second embodiment shown in FIG. 4.

After step A2, the network determination unit 10-6 of the network unauthorized access preventing apparatus 10 determines whether or not the communication partner of the PC 30 exists in the internal network (step C1).

In a case where the communication partner of the PC 30 exists in the internal network (step C1: Yes), the spoof packet sending unit 10-7 of the network unauthorized access preventing apparatus 10 sends a spoof packet to the PC 30 (step A4), and further sends a spoof packet to the internal server 20 (step B1).

In a case where the communication partner of the PC 30 does not exist in an external network (step C1: No), the spoof packet sending unit 10-7 of the network unauthorized access preventing apparatus 10 sends a spoof packet which is different from that in step A4 to the PC 30 (step C2), and further sends a spoof packet to all the routers registered on the router list 10-5 (step C3).

Due to this, also in case of communication via a router, unauthorized access by the PC 30 can be prevented.

When it is assumed that the MAC address and IP address of the router 40 are Mr and Ir respectively, the spoof packet to be sent to the PC 30 by the network unauthorized access preventing apparatus 10 when the PC 30 is attempting to access the external network is an ARP response packet indicating that the MAC address that corresponds to the IP address Ir is Mx.

Because of this, thereafter, when the PC 30 tries to send a packet to the router 40, it sends the packet to the address Mx as the MAC address corresponding to the IP address Ir, making it possible to prevent the packet from arriving at the router 40.

The spoof packet to be sent to the router 40 is an ARP response packet indicating that the MAC address that corresponds to the IP address Ip is Mx.

Due to this, thereafter, when the router 40 tries to send a packet to the PC 30, it sends the packet to the address Mx as the MAC address corresponding to the IP address Ip, making it possible to prevent the packet from arriving at the PC 30.

According to the present embodiment, even in a case where the external sever 50 is an information processing apparatus other than a server, it is possible to likewise prevent unauthorized access by the PC 30.

Fourth Embodiment

Figure 8:
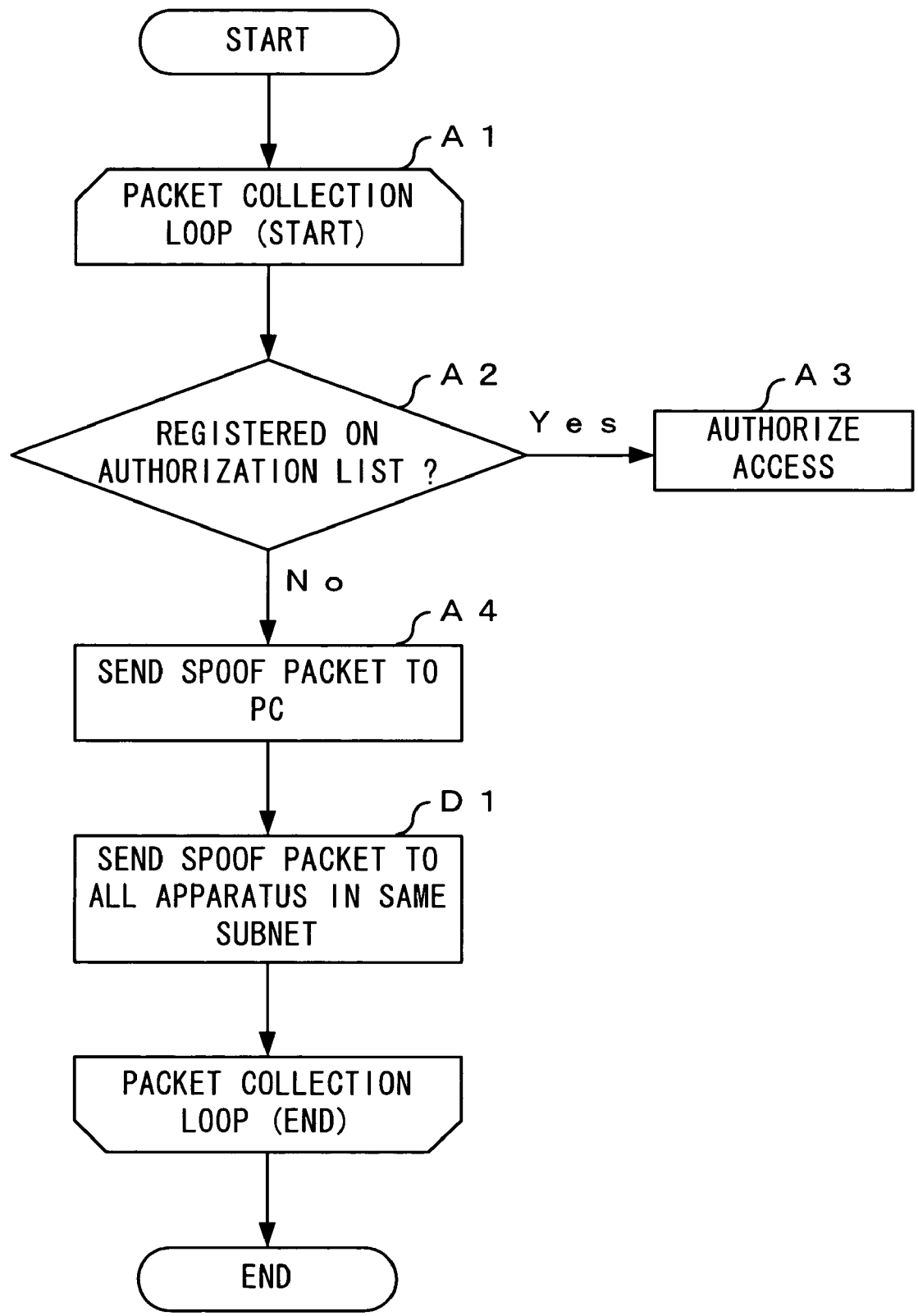
FIG. 8 is a flowchart showing a process procedure of a network unauthorized access preventing system according to a fourth embodiment of the present invention.

Next, the fourth embodiment of the present invention will be explained with reference to FIG. 8. FIG. 8 is a flowchart showing a process procedure of the network unauthorized access preventing system according to the present embodiment.

The present embodiment is different from the second embodiment in that the system of the present embodiment can prevent unauthorized access not only in a case where the invalidly accessing PC 30 attempts to access the internal server 20 but also in a case where the PC 30 attempts to access other apparatuses that are preset in the same subset.

That is, according to the second embodiment, unauthorized access to the internal server 20 can be prevented, but unauthorized access to other apparatuses in the same subnet cannot be prevented.

To solve this problem, the present embodiment is improved in the algorithm employed in the second embodiment.

The configuration of the system of the first embodiment shown in FIG. 1 and FIG. 2 can be used as the configuration of the system of the present embodiment. However, it is assumed that there are apparatuses that may be the targets of the PC 30 to attempt to communicate with in the network 80 of the present embodiment, other than the internal server 10.

Further, the spoof packet sending unit 10-4 of the network unauthorized access preventing apparatus 10 according to the present embodiment not only sends a spoof packet to the PC 30, but also sends a spoof packet to all the apparatuses that exist in the same subnet. Other components of the system of the present embodiment are the same as those in the first embodiment.

In FIG. 8, steps A1 to A4 are the same as those in the second embodiment shown in FIG. 4.

However, according to the present embodiment, in addition to sending a spoof packet to the PC 30 (step A4), the network unauthorized access preventing apparatus 10 sends a spoof packet to all apparatuses that exist in the same subnet (step D1). Due to this, when not only the internal server 20 but also all apparatuses in the same subnet try to return a response to the PC 30, the response packet is prevented from being returned to the PC 30, making it possible to more securely prevent unauthorized access by the PC 30 to the network.

The proof packet to be sent to all apparatuses in the same network is an ARP response packet indicating that the MAC address that corresponds to the IP address Ip is Mx. Because of this, thereafter, when, an apparatus in the same subnet tries to send a response packet to the PC 30, the response packet is sent to the address Mx as the MAC address corresponding to the IP address Ip, making it possible to prevent the response packet from arriving at the PC 30.

Fifth Embodiment

Figure 9:
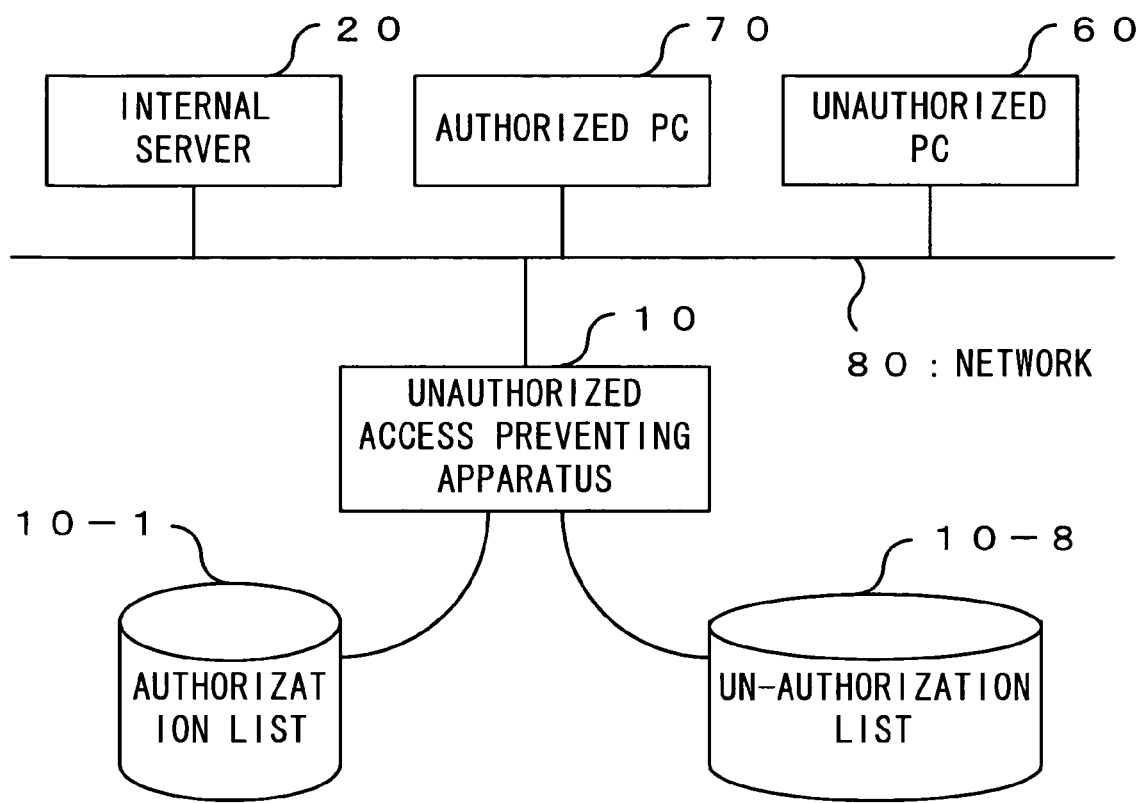
FIG. 9 is a block diagram showing the configuration of a network unauthorized access preventing system according to a fifth embodiment of the present invention.
Figure 10:
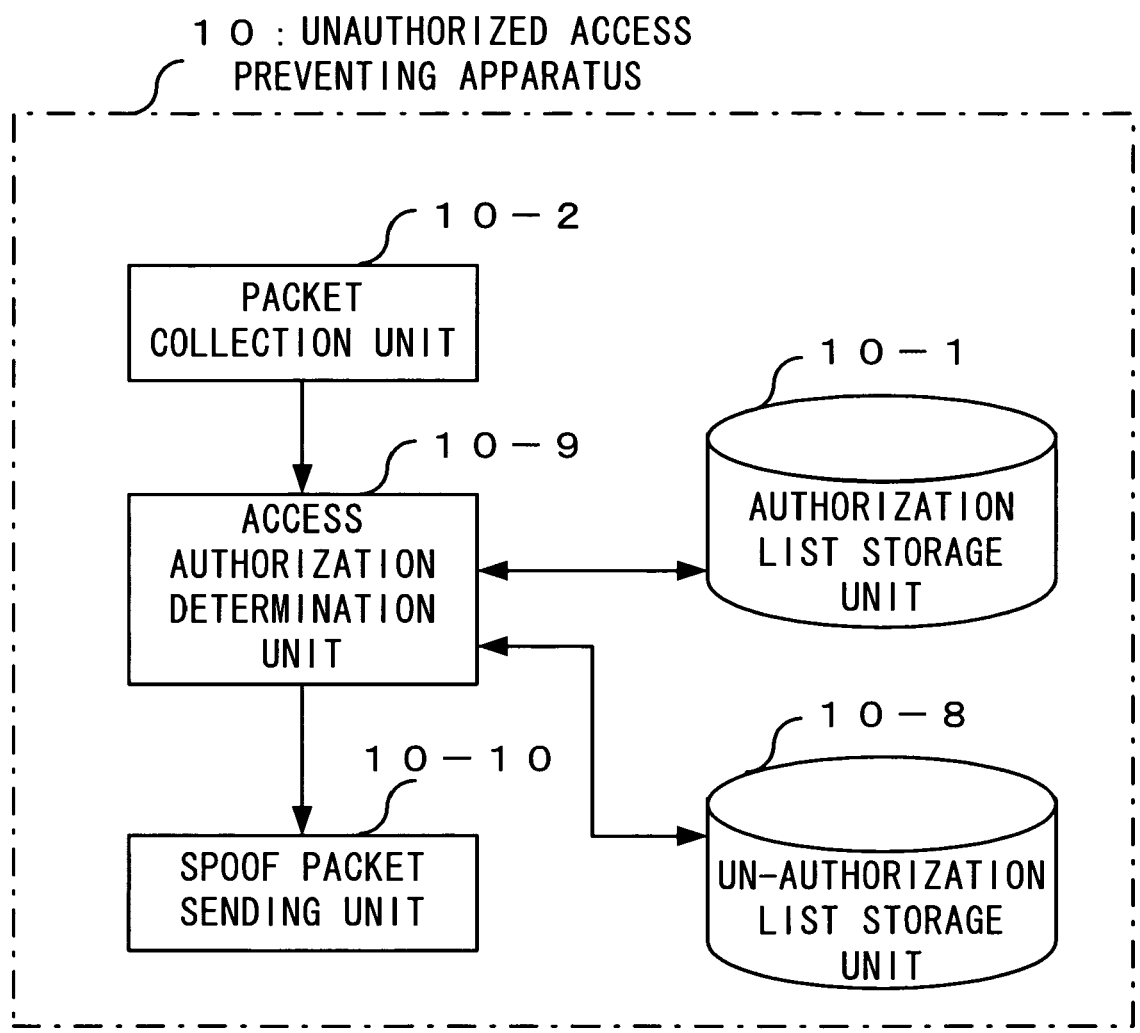
FIG. 10 is a block diagram showing the configuration of a network unauthorized access preventing apparatus in the network unauthorized access preventing system according to the fifth embodiment of the present invention.

Next, the fifth embodiment of the present invention will be explained with reference to FIG. 9 and FIG. 10. FIG. 9 is a block diagram showing the configuration of the network unauthorized access preventing system according to the present embodiment. FIG. 10 is a block diagram showing the configuration of the network unauthorized access preventing apparatus in the network unauthorized access preventing system according to the present embodiment.

The present embodiment is different from the first to fourth embodiments in that the system of the present embodiment can prevent unauthorized access to the internal server 20 by an invalidly accessing PC, even in a case where this PC has received an ARP packet which is sent by an information processing apparatus authorized to access the network to communicate with the internal server 20.

That is, in the algorithms used in the first to fourth embodiments, the ARP packet sent by the PC 30 to the internal server 20 serves as the trigger for inviting the unauthorized access preventing process. Therefore, the network unauthorized access preventing apparatus 10 does not react to an ARP request packet sent to the internal server 20 by an authorized PC 70 in a broadcast segment shown in FIG. 9 which PC 70 is permitted to access, or to an ARP response packet returned by the internal server 20 to the authorized PC 70. Consequently, at the timing an unauthorized PC 60 receives this ARP packet, it becomes able to access the authorized PC 70 and the internal server 20.

To solve this problem, the present embodiment is improved in the algorithms employed in the above-described embodiments.

As shown in FIG. 9, the network unauthorized access preventing system according to the present embodiment comprises a network unauthorized access preventing apparatus 10 having an authorization list storage unit 10-1 and an un-authorization list 10-8, an internal server 20, an unauthorized PC 60, and an authorized PC 70.

As shown in FIG. 10, the network unauthorized access preventing apparatus 10 of the present embodiment comprises an authorization list storage unit 10-, a packet collection unit 10-2, an un-authorization list storage unit 10-8 (un-authorization list 10-8), an access authorization determination unit 10-9, and a spoof packet sending unit 10-10.

The authorization list storage unit 10-1 and the packet collection unit 10-2 are the same as those shown in FIG. 2.

The un-authorization list storage unit 10-8 is a storage device which stores the IP address and MAC address of a PC that is not authorized to access the network (a PC whose MAC address is not stored in the authorization list 10-1). The un-authorization list needs not also to be included in the network unauthorized access preventing apparatus 10 but may be prepared as an external storage device.

The access authorization determination unit 10-9 determines whether or not a packet collected by the packet collection unit 10-2 is an ARP packet (including both ARP request and ARP response). If it is an ARP packet, the access authorization determination unit 10-9 refers to the authorization list storage unit 10-1 based on the MAC address of the sender of this ARP packet to determine whether the sender apparatus is authorized to access the network. Further, in a case where the sender apparatus is an unauthorized PC 60 that is not permitted to access the network, the access authorization determination unit 10-9 registers the IP address and MAC address of this sender apparatus in the un-authorization list storage unit 10-8.

The spoof packet sending unit 10-10 broadcasts packets containing false MAC addresses of all the unauthorized PCs 60 that are registered in the un-authorization list storage unit 10-8.

The internal server 20 is the same as that shown in FIG. 1.

The unauthorized PC 60 corresponds to the PC 30 in the first to fourth embodiments, and is an information processing apparatus that is not authorized to access the network 80.

The authorized PC 70 is an information processing apparatus whose MC address is stored in the authorization list storage unit 10-1 and which is authorized to access the network 80.

Next, a process procedure of the network unauthorized access preventing system according to the present embodiment will be explained with reference to FIG. 11.

Figure 11:
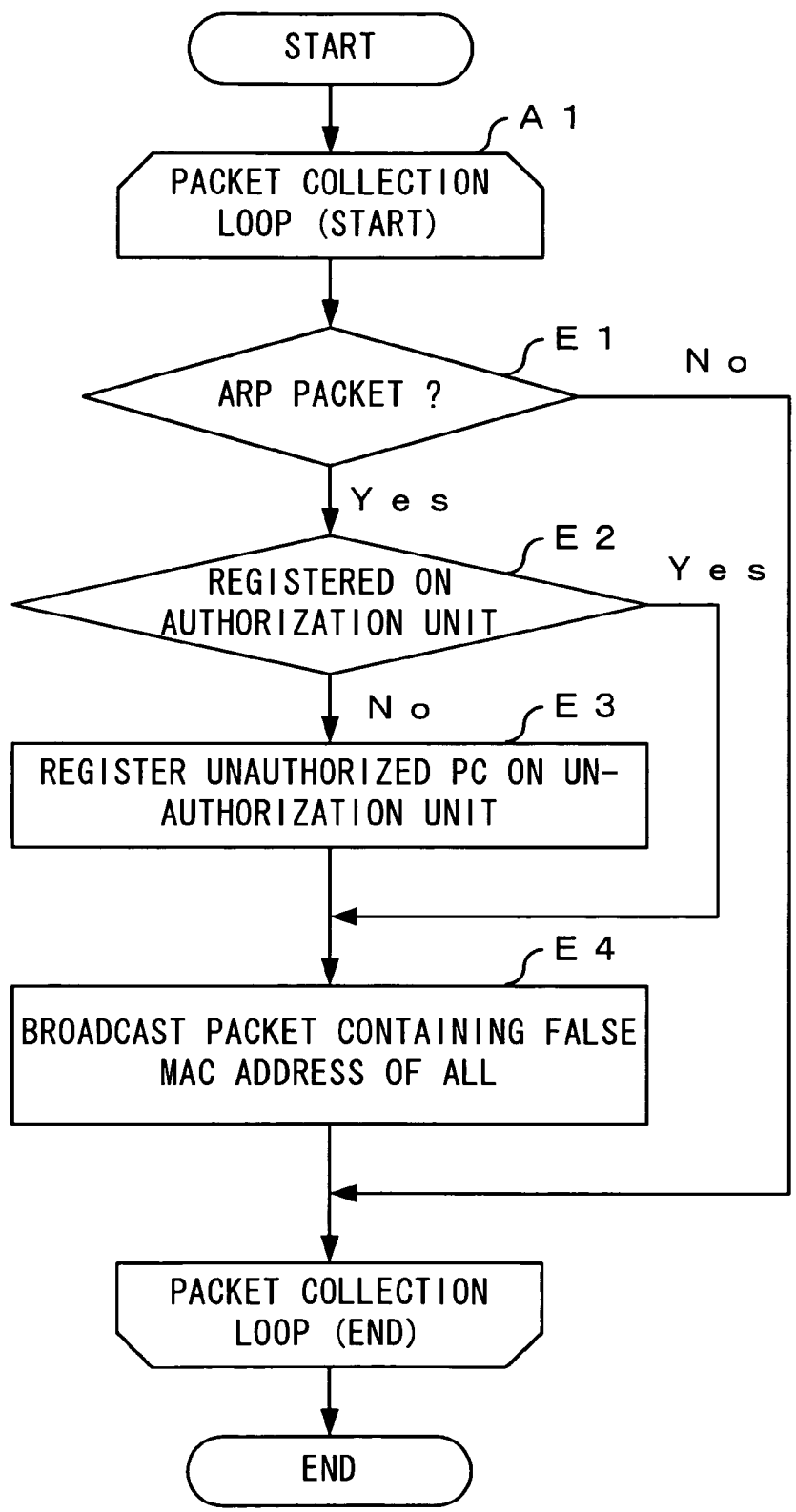
FIG. 11 is a flowchart showing a process procedure of the network unauthorized access preventing system according to the fifth embodiment.

FIG. 11 is a flowchart showing the process procedure of the network unauthorized access preventing system according to the present embodiment.

In FIG. 11, step A1 is the same as that of the first embodiment shown in FIG. 3.

After step A1, when receiving a packet, the network unauthorized access preventing apparatus 10 determines whether the received packet is an ARP packet or not (step E1). If it is an ARP packet (step E1: Yes), the network unauthorized access preventing apparatus 10 determines whether or not the MAC address of the apparatus the has sent this ARP packet is registered in the authorization list storage unit 10.1 (step E2). That is, the network unauthorized access preventing apparatus 10 determines whether the sender apparatus is an unauthorized PC 60 or an authorized PC 70.

In a case where the sender apparatus is an unauthorized PC 60 (step E2: No), the network unauthorized access preventing apparatus 10 registers the IP address and MAC address of this unauthorized PC 60 in the un-authorization list 10-8 (step E3). In a case where the sender apparatus is an authorized PC 70 (step E2: Yes), this step is omitted.

Next, the network unauthorized access preventing apparatus 10 broadcasts ARP packets containing false MAC addresses of all the unauthorized PCs 60 registered on the un-authorization list 10-8 (step E4).

As a result, even if the unauthorized PC 60 attempts to invalidly access the internal server 20 when the MAC address of the internal server 20 that has been retained by the unauthorized PC 60 is somehow returned to the correct one, the internal server 20 does not respond to this access request, making it possible to prevent unauthorized access.

If it is assumed that the IP address of the unauthorized PC 60 that is registered on the unauthorized list 10-8 is Ip, the ARP packet containing the false MAC address to be broadcast is an ARP response packet indicating that the MAC address that corresponds to the IP address Ip is Mx.

Due to this, thereafter, even if the unauthorized PC 60 receives an ARP packet that is irrelevant to itself and attempts to invalidly access the internal server 20 by using this packet, it is possible to prevent the unauthorized PC 60 from doing so.

In each of the above-described embodiments, there may be a plurality of the internal server 20, the PC 30, the router 40, the external server 50, the unauthorized PC 60, and the authorized PC 70 respectively in the network unauthorized access preventing system.

There might be a case where a phenomenon such as a "storm" occurs in which many packets concentrate on a network due to a chain reaction of one packet triggering another packet. Therefore, when installing the above-described algorithms, it is necessary to consider setting such a condition that spoof packet sending timings should be spaced by at least 0.5 second if a spoof packet is to be sent to a same apparatus more than once, in order not to invite such a phenomenon The operations of access authorization determination, spoof packet sending, etc. described above are executed by a network unauthorized access preventing program.

This network unauthorized access preventing program is developed in a memory included in the network unauthorized access preventing apparatus, and is executed by each of the above-described function units in cooperation with a CPU (Central Processing Unit).

That is, the above-described processes according to the embodiments of the present invention are realized by the network unauthorized access preventing program and the network unauthorized access preventing apparatus in cooperation with each other.

The present invention is not limited to the above-described embodiments, but may be variously modified within the scope/of the meaning of the present invention.

For example, the network unauthorized access preventing apparatus may be configured by dividing each component thereof into more detailed functions.

The present invention can suitably be used for a purpose for preventing deterioration of security of an in-house system, which might be caused when a worker in a company having this in-house system connects his/her own computer to the in-house network. The present invention can also be used for preventing information leakage where an outsider connects his/her own computer to an in-house network to access confidential information and steal the information.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention This application is based on Japanese Patent Application No. 2003-305246 filed on Aug. 28, 2003 and including specification, claims, drawings and summary. The disclosure of the above Japanese Patent Application is incorporated herein by reference in its entirety.

What is claimed is:

1. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, wherein said network unauthorized access preventing apparatus comprises:

an authorization list storage unit which stores a physical address of an information processing apparatus which is authorized to access said network;

collects all packets transmitted via said network in an indiscriminate reception mode;

determines whether or not a physical address of a packet sender which is contained in a collected packet is registered in said authorization list storage unit, and detects the packet sender of this packet as said unauthorized apparatus in a case where the physical address is not registered in said authorization list storage unit;

sets a predetermined designation time when receiving the request;

in a case where the correct response packet is sent to said unauthorized apparatus from said information processing apparatus regardless of whether it is before or after the designation time elapses, receives the correct response packet and sends the response packet containing the false physical address to said unauthorized apparatus immediately after receiving the correct response packet; and in a case where not receiving the correct response packet before the designation time elapses, sends the response packet containing the false physical address to said unauthorized apparatus when the designation time elapses.

2. A network unauthorized access preventing system for preventing an unauthorized apparatus, which is not authorized to access a network, from accessing one or more information processing apparatuses connected to said network, said system comprising:

a network unauthorized access preventing apparatus, wherein said network unauthorized access preventing apparatus:

sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address; and at the same time, sends a response packet containing a false physical address as a physical address of said unauthorized apparatus to said information processing apparatus.

3. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, wherein said network unauthorized access preventing apparatus:

comprises an authorization list storage unit which stores a physical address of an information processing apparatus which is authorized to access said network;

collects all packets transmitted via said network in an indiscriminate reception mode;

determines whether or not a physical address of a packet sender contained in a collected packet is registered in said authorization list storage unit, and detects the packet sender of this packet as said unauthorized apparatus in a case where the physical address is not registered in said authorization list storage unit;

sets a predetermined designation time when receiving the request;

in a case where the correct response packet is sent to said unauthorized apparatus from said information processing apparatus regardless of whether it is before or after the designation time elapses, receives the correct response packet and sends the response packet containing the false physical address to said unauthorized apparatus immediately after receiving the correct response packet;

in a case where not receiving the correct response packet before the designation time elapses, sends the response packet containing the false physical address to said unauthorized apparatus when the designation time elapses;

and at the same time, sends a response packet containing a false physical address as a physical address of said unauthorized apparatus to said information processing apparatus.

4. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, wherein said network unauthorized access preventing apparatus:

sends a response packet containing a false physical address as a physical address of said information processing apparatus to said unauthorized apparatus; and at the same time, sends a response packet containing a false physical address as a physical address of said unauthorized apparatus to all information processing apparatuses existing in a same subnet as said information processing apparatus.

5. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, wherein said network unauthorized access preventing apparatus:

comprises an authorization list which stores a physical address of an information processing apparatus which is authorized to access said network;

collects all packets transmitted via said network in an indiscriminate reception mode;

determines whether or not a physical address of a packet sender contained in a collected packet is registered in said authorization list storage unit, and detects the packet sender of this packet as the unauthorized apparatus in a case where the physical address is not registered in said authorization list storage unit;

sets a predetermined designation time when receiving the request;

in a case where the correct response packet is sent to said unauthorized apparatus from said information processing apparatus regardless of whether it is before or after the designation time elapses, receives the correct response packet and sends the response packet containing the false physical address to said unauthorized apparatus immediately after receiving the correct response packet;

in a case where not receiving the correct response packet before the designation time elapses, sends the response packet containing the false physical address to said unauthorized apparatus when the designation time elapses; and at the same time sends a response packet containing a false physical address as a physical address of said unauthorized apparatus to all information processing apparatuses that exist in a same subnet as said information processing apparatus.

6. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, comprising an external information processing apparatus which is connected to said network via a relay apparatus, wherein said network unauthorized access preventing apparatus:

comprises a relay apparatus list storage unit which stores a physical address of a relay apparatus connected to said network;

determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, and in a case where said unauthorized apparatus attempts to access an external information processing apparatus existing in an external network;

sends a response packet containing a false physical address as a physical address of said relay apparatus to said unauthorized apparatus; and sends a response packet containing a false physical address as a physical address of said unauthorized apparatus to all relay apparatuses whose physical address is stored in said relay apparatus list storage unit.

7. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, comprising an external information processing apparatus which is connected to said network via a relay apparatus, wherein said network unauthorized access preventing apparatus:

comprises an authorization list storage unit which stores a physical address of an information processing apparatus which is authorized to access said network;

comprises a relay apparatus list storage unit which stores a physical address of a relay apparatus which is connected to said network;

collects all packets transmitted via said network in an indiscriminate reception mode;

determines whether or not a physical address of a packet sender contained in a collected packet is registered in said authorization list storage unit, and detects the packet sender of this packet as the unauthorized apparatus in a case where the physical address is not registered in said authorization list storage unit;

sets a predetermined designation time when receiving the request;

in a case where the correct response packet is sent to said unauthorized apparatus from said information processing apparatus regardless of whether it is before or after the designation time elapses, receives the correct response packet ad sends the response packet containing the false physical address to said unauthorized apparatus immediately after receiving the correct response packet;

determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, and in a case where said unauthorized apparatus attempts to access an external information processing apparatus existing in an external network;

sends a response packet containing a false physical address as a physical address of said relay apparatus to said unauthorized apparatus; and sends a response packet containing a false physical address as a physical address of said unauthorized apparatus to all relay apparatuses whose physical address is stored in said relay apparatus list storage unit.

8. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, comprising an external information processing apparatus which is connected to said network via a relay network, wherein said network unauthorized access preventing apparatus:

comprises a relay apparatus list storage unit which stores a physical address of a relay apparatus connected to said network;

determines whether said unauthorized apparatus attempts to access an information processing apparatus existing in said network or attempts to access an external information processing apparatus existing in an external network, based on an IP address of an information processing apparatus which said unauthorized apparatus attempts to access which IP address is contained in the request, and in a case where said unauthorized apparatus attempts to access an external information processing apparatus existing in an external network;

sends a response packet containing a false physical address as a physical address of said relay apparatus to said unauthorized apparatus;

sends a response packet containing a false physical address as a physical address of said unauthorized apparatus to all relay apparatuses whose physical address is stored in said relay apparatus list storage unit;

sends a response packet containing a false physical address as a physical address of said information processing apparatus to said unauthorized apparatus; and sends a response packet containing a false physical address as a physical address of said unauthorized apparatus to said information processing apparatus.

9. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, comprising an external information processing apparatus which is connected to said network via a relay apparatus, wherein said network unauthorized access preventing apparatus:

comprises a relay apparatus list storage unit which stores a physical address of a relay apparatus connected to said network;

determines whether said unauthorized apparatus attempts to access an information processing apparatus existing in said network or attempts to access an external information processing apparatus existing in an external network, based on an IP address of an information processing apparatus which said unauthorized apparatus attempts to access which IP address is contained in the request, and in a case where said unauthorized apparatus attempts to access an external information processing apparatus existing in an external network;

sends a response packet containing a false physical address as a physical address of said relay apparatus to said unauthorized apparatus;

sends a response packet containing a false physical address as a physical address of said unauthorized apparatus to all relay apparatuses whose physical address is stored in said relay apparatus list storage unit;

sends a response packet containing a false physical address as a physical address of said information processing apparatus to said unauthorized apparatus; and sends a response packet containing a false physical address as a physical address of said unauthorized apparatus to all information processing apparatuses that exist in a same subnet as said information processing apparatus.

10. A network unauthorized access preventing system for preventing an unauthorized apparatus, which is not authorized to access a network, from accessing one or more information processing apparatuses connected to said network, said system comprising:

a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, comprising an external information processing apparatus which is connected to said network via a relay apparatus, wherein said network unauthorized access preventing apparatus:

comprises an authorization list storage unit which stores a physical address of an information processing apparatus which is authorized to access said network, and a relay apparatus list storage unit which stores a physical address of a relay apparatus which is connected to said network;

collects all packets transmitted via said network in an indiscriminate reception mode;

determines whether a physical address of a packet sender which is contained in a collected packet is registered in said authorization list storage unit, and detects the packet sender of this packet as said unauthorized apparatus in a case where the physical address is not registered;

sets a predetermined designation time when receiving the request;

in a case where the correct response packet is sent to said unauthorized apparatus from said information processing apparatus regardless of whether it is before or after the designation time elapses, receives the correct response packet and sends the response packet containing the false physical address to said unauthorized apparatus immediately after receiving the correct response packet;

in a case where not receiving the correct response packet before the designation time elapses, sends the response packet containing the false physical address to said unauthorized apparatus when the designation time elapses;

sends a response packet containing a false physical address as a physical address of said unauthorized apparatus to said information processing apparatus;

determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, and in a case where said unauthorized apparatus attempts to access an external information processing apparatus existing in an external network;

sends a response packet containing a false physical address as a physical address of said relay apparatus to said unauthorized apparatus; and sends a response packet containing a false physical address as a physical address of said unauthorized apparatus to all relay apparatuses whose physical address is stored in said relay apparatus list storage unit.

11. A network unauthorized access preventing system for preventing an unauthorized apparatus, which is not authorized to access a network, from accessing one or more information processing apparatuses connected to said network, said system comprising:
- a network unauthorized access preventing apparatus which sends a response packet containing a false physical address as a physical address of said information processing apparatus to said unauthorized apparatus, after said information processing apparatus sends a correct response packet to said unauthorized apparatus in response to a request which is broadcast from said unauthorized apparatus for knowing a physical address, comprising an external information processing apparatus which is connected to said network via a relay apparatus, wherein said network unauthorized access preventing apparatus:
- comprises an authorization list storage unit which stores a physical address of an information processing apparatus which is authorized to access said network, and a relay apparatus list storage unit which stores a physical address of a relay apparatus which is connected to said network;
- collects all packets transmitted via said network in an indiscriminate reception mode;
- determines whether a physical address of a packet sender which is contained in a collected packet is registered in said authorization list storage unit, and detects the packet sender of this packet as said unauthorized apparatus in a case where the physical address is not registered;
- sets a predetermined designation time when receiving the request;
- in a case where the correct response packet is sent to said unauthorized apparatus from said information processing apparatus regardless of whether it is before or after the designation time elapses, receives the correct response packet and sends the response packet containing the false physical address to said unauthorized apparatus immediately after receiving the correct response packet;
- in a case where not receiving the correct response packet before the designation time elapses, sends the response packet containing the false physical address to said unauthorized apparatus when the designation time elapses;
- sends a response packet containing a false physical address as a physical address of said unauthorized apparatus to all information processing apparatuses that exist in a same subnet as said information processing apparatus;
- determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, and in a case where said unauthorized apparatus attempts to access an external information processing apparatus existing in an external network;
- sends a response packet containing a false physical address as a physical address of said relay apparatus to said unauthorized apparatus; and
- sends a response packet containing a false physical address as a physical address of said unauthorized apparatus to all relay apparatuses whose physical address is stored in said relay apparatus list storage unit.

12. A network unauthorized access preventing apparatus for preventing an unauthorized apparatus, which is not authorized to access a network, from accessing one or more information processing apparatuses in said network, said apparatus comprising:
- an authorization list storage unit which stores a physical address of an information processing apparatus which is authorized to access said network;
- a packet collection unit which collects all packets transmitted via said network in an indiscriminate reception mode;
- an access authorization determination unit which determines whether a physical address of a packet sender which is contained in a collected packet is registered in said authorization list storage unit, and detects the packet sender of this packet as said unauthorized apparatus in a case where the physical address is not registered; and
- a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, wherein said false packet sending unit:
- sets a predetermined designation time when said network unauthorized access preventing apparatus receives the request;
- in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet; and
- in a case where said network unauthorized access preventing apparatus does not receive the correct response packet before the designation time elapses, sends the response packet containing the false physical address to said unauthorized apparatus when the designation time elapses.

13. A network unauthorized access preventing apparatus for preventing an unauthorized apparatus, which is not authorized to access a network, from accessing one or more information processing apparatuses in said network, said apparatus comprising:
- an authorization list storage unit which stores a physical address of an information processing apparatus which is authorized to access said network;
- a packet collection unit which collects all packets transmitted via said network in an indiscriminate reception mode;
- an access authorization determination unit which determines whether a physical address of a packet sender which is contained in a collected packet is registered in said authorization list storage unit, and detects the packet sender of this packet as said unauthorized apparatus in a case where the physical address is not registered; and
- a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, wherein said false packet sending unit:

sends a packet containing a false physical address as a physical address of said information processing apparatus to said unauthorized apparatus; and at the same time, sends a response packet containing a false physical address as a physical address of said unauthorized apparatus to said information processing apparatus.

14. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, wherein said false packet sending unit:

sets a predetermined designation time when said network unauthorized access preventing apparatus receives the request;

in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet;

in a case where said network unauthorized access preventing apparatus does not receive the correct response packet before the designation time elapses, sends the response packet containing the false physical address to said unauthorized apparatus when the designation time elapses; and at the same time, sends a response packet containing a false physical address as a physical address of said unauthorized apparatus to said information processing apparatus.

15. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, wherein said false packet sending unit:

sends a response packet containing a false physical address as a physical address of said information processing apparatus to said unauthorized apparatus; and at the same time, sends a response packet containing a false physical address as a physical address of said unauthorized apparatus to all information processing apparatuses that exist in a same subnet as said information processing apparatus.

16. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, wherein said false packet sending unit:

sets a predetermined designation time when said network unauthorized access preventing apparatus receives the request;

in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet;

in a case where said network unauthorized access preventing apparatus does not receive the correct response packet before the designation time elapses, sends the response packet containing the false physical address to said unauthorized apparatus when the designation time elapses; and at the same time, sends a response packet containing a false physical address as a physical address of said unauthorized apparatus to all information processing apparatuses that exist in a same subnet as said information processing apparatus.

17. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, a relay apparatus list storage unit which stores a physical address of a relay apparatus connected to said network; and a network determination unit which determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, wherein in a case where said unauthorized apparatus attempts to access an external information processing unit existing in an external network, said false packet sending unit:

sends a response packet containing a false physical address as a physical address of said relay apparatus to said unauthorized apparatus; and sends a response packet containing a false physical address as a physical address of said unauthorized apparatus to all relay apparatuses whose physical address is stored in said relay apparatus list storage unit.

18. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, a relay apparatus list storage unit which stores a physical address of a relay apparatus connected to said network; and a network determination unit which determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, wherein said false packet sending unit:

sets a predetermined designation time when said network unauthorized access preventing apparatus receives the request;

in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet;

in a case where said network unauthorized access preventing apparatus does not receive the correct response packet before the designation time elapses, sends the response packet containing the false physical address to said unauthorized apparatus when the designation time elapses;

in a case where said unauthorized apparatus attempts to access an external information processing apparatus existing in an external network, sends a response packet containing a false physical address as a physical address of said relay apparatus to said unauthorized apparatus; and at the same time sends a response packet containing a false physical address as a physical address of said unauthorized apparatus to all relay apparatuses whose physical address is stored in said relay apparatus list storage unit.

19. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, a relay apparatus list storage unit which stores a physical address of a relay apparatus which is connected to said network; and a network determination unit which determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, wherein in a case where said unauthorized apparatus attempts to access an external information processing apparatus existing in an external network, said false packet sending unit:

sends a response packet containing a false physical address as a physical address of said relay apparatus to said unauthorized apparatus;

sends a response packet containing a false physical address as a physical address of said unauthorized apparatus to all relay apparatuses whose physical address is stored in said relay apparatus list storage unit; and at the same time, sends a response packet containing a false physical address as a physical address of said unauthorized apparatus to said information processing apparatus.

20. A network unauthorized access preventing apparatus for preventing an unauthorized apparatus, which is not authorized to access a network, from accessing one or more information Processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address, a relay apparatus list storage unit which stores a physical address of a relay apparatus connected to said network; and a network determination unit which determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, wherein in a case where said unauthorized apparatus attempts to access an external information processing apparatus existing in an external network, said false packet sending unit:

sends a response packet containing a false physical address as a physical address of said relay apparatus to said unauthorized apparatus;

sends a response packet containing a false physical address as a physical address of said unauthorized apparatus to all relay apparatuses whose physical address is stored in said relay apparatus list storage unit;

and at the same time, sends a response packet containing a false physical address as a physical address of said unauthorized apparatus to all information processing apparatuses existing in a same subnet as said information processing apparatuses.

21. A network unauthorized access preventing apparatus for preventing an unauthorized apparatus, which is not authorized to access a network, from accessing one or more information processing apparatuses in said network, said apparatus comprising:

an authorization list storage unit which stores a physical address of an information processing apparatus which is authorized to access said network;

a packet collection unit which collects all packets transmitted via said network in an indiscriminate reception mode;

an access authorization determination unit which determines whether a physical address of a packet sender which is contained in a collected packet is registered in said authorization list storage unit, and detects the packet sender of this packet as said unauthorized apparatus in a case where the physical address is not registered; and a false packet sending unit which sends a response packet containing a false physical address as a physical address of said information processing apparatus to said unauthorized apparatus, after a correct response packet is sent to said unauthorized apparatus from said information Processing apparatus in response to a request which is broadcast from said unauthorized apparatus for knowing a physical address, a relay apparatus list storage unit which stores a physical address of a relay apparatus connected to said network; and a network determination unit which determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, wherein said false packet sending unit:
- sets a predetermined designation time when said network unauthorized access preventing apparatus receives the request;
- in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet;
- in a case where said network unauthorized access preventing apparatus does not receive the correct response packet before the designation time elapses, sends the response packet containing the false physical address to said unauthorized apparatus when the designation time elapses;
- in a case where said unauthorized apparatus attempts to access an external information processing apparatus existing in an external network, sends a response packet containing a false physical address as a physical address of said relay apparatus to said unauthorized apparatus;
- at the same time, sends a response packet containing a false physical address as a physical address of said unauthorized apparatus to all relay apparatuses whose physical address is stored in said relay apparatus list storage unit;
- sets a predetermined designation time when said network unauthorized access preventing apparatus receives the request;
- in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet;
- in a case where said network unauthorized access preventing apparatus does not receive the correct response packet before the designation time elapses, sends the response packet containing the false physical address to said unauthorized apparatus when the designation time elapses; and
- at the same time, sends a responses packet containing a false physical address as a physical address of said unauthorized apparatus to said information processing apparatus.

22. A network unauthorized access preventing apparatus for preventing an unauthorized apparatus, which is not authorized to access a network, from accessing one or more information processing apparatuses in said network, said apparatus comprising:
- an authorization list storage unit which stores a physical address of an information processing apparatus which is authorized to access said network;
- a packet collection unit which collects all packets transmitted via said network in an indiscriminate reception mode;
- an access authorization determination unit which determines whether a physical address of a packet sender which is contained in a collected packet is registered in said authorization list storage unit, and detects the packet sender of this packet as said unauthorized apparatus in a case where the physical address is not registered; and
- a false packet sending unit which sends a response packet containing a false physical address as a physical address of said information processing apparatus to said unauthorized apparatus, after a correct response packet is sent to said unauthorized apparatus from said information processing apparatus in response to a request which is broadcast from said unauthorized apparatus for knowing a physical address,
- a relay apparatus list storage unit which stores a physical address of a relay apparatus connected to said network; and
- a network determination unit which determines whether said unauthorized apparatus attempts to access an information processing apparatus existing in said network or attempts to access an external information processing apparatus existing in an external network based on an IP address of an information processing apparatus which said unauthorized apparatus attempts to access which IP address is contained in the request, wherein in a case where said unauthorized apparatus attempts to access an external information processing apparatus existing in an external network, said false packet sending unit:
  - sends a response packet containing a false physical address as a physical address of said relay apparatus to said unauthorized apparatus; and
  - at the same time, sends a response packet containing a false physical address as a physical address of said unauthorized apparatus to all relay apparatuses whose physical address is stored in said relay apparatus list storage unit, and said false packet sending unit:
    - sets a predetermined designation time when said network unauthorized access preventing apparatus receives the request;
    - in a case where the correct response packet is sent to said unauthorized apparatus from said information processing apparatus regardless of whether it is before or after the designation time elapses, sends the response packet containing the false physical address to said unauthorized apparatus immediately after said network unauthorized access preventing apparatus receives the correct response packet;
    - in a case where said network unauthorized access preventing apparatus does not receive the correct response packet before the designation time elapses, sends the response packet containing the false physical address to said unauthorized apparatus when the designation time elapses; and
    - at the same time, sends a response packet containing a false physical address as a physical address of said unauthorized apparatus to all information processing apparatuses that exist in a same subnet as said information processing apparatus.

* * * * *